United States Patent
Gonzalez-Banos et al.

(10) Patent No.: US 10,708,635 B2
(45) Date of Patent: Jul. 7, 2020

(54) SUBSUMPTION ARCHITECTURE FOR PROCESSING FRAGMENTS OF A VIDEO STREAM

(71) Applicants: Hector H. Gonzalez-Banos, Mountain View, CA (US); Max McFarland, Sunnyvale, CA (US); Ramya Narasimha, Palo Alto, CA (US)

(72) Inventors: Hector H. Gonzalez-Banos, Mountain View, CA (US); Max McFarland, Sunnyvale, CA (US); Ramya Narasimha, Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/453,722

(22) Filed: Mar. 8, 2017

(65) Prior Publication Data

US 2018/0255329 A1    Sep. 6, 2018

Related U.S. Application Data

(63) Continuation-in-part of application No. 15/447,416, filed on Mar. 2, 2017.

(51) Int. Cl.
*H04N 21/234*    (2011.01)
*H04N 21/44*    (2011.01)
(Continued)

(52) U.S. Cl.
CPC ... *H04N 21/23418* (2013.01); *G06F 16/2379* (2019.01); *G06F 16/70* (2019.01);
(Continued)

(58) Field of Classification Search
CPC ......... H04N 21/23418; H04N 21/2353; H04N 21/4223; H04N 21/44008; H04N 21/8456;
(Continued)

(56) References Cited

U.S. PATENT DOCUMENTS 6,496,856 B1 * 12/2002 Kenner ............ G06F 17/30017
348/E5.008
8,311,277 B2    11/2012 Peleg et al.
(Continued)

FOREIGN PATENT DOCUMENTS

EP    0 932 298    7/1999
EP    307938    9/2016
(Continued)

OTHER PUBLICATIONS

Bligh, Alex; "What is Distributed Storage and Why Use It: Part 2", Jul. 26, 2013, flexiant.com, https://web.archive.org/web/20130812213732/http://www.flexiant.com:80/2013/07/26/what-is-distributed-storage-and-why-use-it-part-2/#more-14496; pp. 1-2.*
(Continued)

*Primary Examiner* — Nicholas T Corbo
(74) *Attorney, Agent, or Firm* — Patent Law Works LLP

(57) ABSTRACT

The disclosure includes a system and method for distributing video segments of a video to one or more brokers based on topics and storing the video segments in a distributed commit log associated with the topics. A video processing application decomposes a video into fragments, groups the fragments into topics based on identifiers associated with the fragments, breaks the fragments into a sequence of segments, distributes the sequence of segments to one or more brokers based on the topics, and stores, by the one or more brokers, the sequence of segments associated with a topic in a distributed commit log while preserving a sequence order of the sequence of segments.

20 Claims, 13 Drawing Sheets

(51) Int. Cl.
*G06K 9/00* (2006.01)
*H04N 21/235* (2011.01)
*H04N 21/845* (2011.01)
*H04N 21/4223* (2011.01)
*G06F 16/23* (2019.01)
*G06F 16/78* (2019.01)
*H04L 29/06* (2006.01)
*G06F 16/70* (2019.01)
*G06F 16/783* (2019.01)

(52) U.S. Cl.
CPC ..... *G06F 16/7867* (2019.01); *G06K 9/00771* (2013.01); *H04L 65/602* (2013.01); *H04N 21/2353* (2013.01); *H04N 21/4223* (2013.01); *H04N 21/44008* (2013.01); *H04N 21/8456* (2013.01); *G06F 16/785* (2019.01); *G06F 16/786* (2019.01)

(58) Field of Classification Search
CPC .. G06F 16/2379; G06F 16/7867; G06F 16/70; G06F 16/786; G06F 16/785; H04L 65/602; G06K 9/00771
See application file for complete search history.

(56) References Cited

U.S. PATENT DOCUMENTS

| | | | |
|---|---|---|---|
| 8,949,235 | B2 | 2/2015 | Peleg et al. |
| 10,204,264 | B1 | 2/2019 | Gallagher et al. |
| 2002/0071556 | A1 | 6/2002 | Moskowitz et al. |
| 2002/0071596 | A1* | 6/2002 | Estevez ............... G06T 7/262 382/107 |
| 2002/0172394 | A1 | 11/2002 | Venkatesan et al. |
| 2002/0174773 | A1 | 11/2002 | Cheng |
| 2002/0178368 | A1 | 11/2002 | Yin et al. |
| 2003/0058939 | A1 | 3/2003 | Lee et al. |
| 2003/0194131 | A1 | 10/2003 | Zhao et al. |
| 2004/0098376 | A1 | 5/2004 | Li et al. |
| 2005/0240980 | A1 | 10/2005 | Jun et al. |
| 2006/0064411 | A1 | 3/2006 | Gross et al. |
| 2007/0055695 | A1 | 3/2007 | Dorai et al. |
| 2007/0101147 | A1 | 5/2007 | Brunk et al. |
| 2007/0136656 | A1 | 6/2007 | Nydam et al. |
| 2008/0066136 | A1 | 3/2008 | Dorai et al. |
| 2008/0150431 | A1 | 6/2008 | Preston |
| 2008/0208828 | A1 | 8/2008 | Boiman et al. |
| 2010/0045799 | A1 | 2/2010 | Lei et al. |
| 2010/0082575 | A1 | 4/2010 | Walker et al. |
| 2011/0052144 | A1 | 3/2011 | Abbas et al. |
| 2011/0285748 | A1 | 11/2011 | Slatter et al. |
| 2013/0036124 | A1* | 2/2013 | Ambwani ......... G06F 17/30796 707/749 |
| 2013/0156277 | A1 | 6/2013 | Sasaki |
| 2013/0290249 | A1* | 10/2013 | Merriman ......... G06F 17/30578 707/610 |
| 2014/0047558 | A1 | 2/2014 | Veerubhotla et al. |
| 2014/0324864 | A1 | 3/2014 | Choe et al. |
| 2014/0188840 | A1 | 7/2014 | Agarwal et al. |
| 2015/0254513 | A1 | 9/2015 | Mansour et al. |
| 2015/0269231 | A1 | 9/2015 | Huynh et al. |
| 2016/0019239 | A1 | 1/2016 | Bastaldo-Tsampalis et al. |
| 2016/0071242 | A1 | 3/2016 | Uralsky et al. |
| 2016/0253576 | A1 | 9/2016 | Kilpatrick |
| 2016/0275356 | A1 | 9/2016 | Kuwahara et al. |
| 2016/0323658 | A1 | 11/2016 | Richardson |
| 2017/0339238 | A1* | 11/2017 | Qin ........................ H04L 67/26 |
| 2018/0115788 | A1 | 4/2018 | Burns et al. |
| 2018/0376224 | A1 | 12/2018 | Chun et al. |

FOREIGN PATENT DOCUMENTS

| | | | |
|---|---|---|---|
| JP | H10-84525 | | 3/1998 |
| JP | H10-240774 | | 9/1998 |
| JP | 2000056681 | A | 2/2000 |
| JP | 2001024880 | A | 1/2001 |
| JP | 2002-170104 | | 6/2002 |
| JP | 2002-538642 | | 11/2002 |
| JP | 2003-30204 | | 1/2003 |
| JP | 2005-123824 | | 5/2005 |
| JP | 2005346658 | A | 12/2005 |
| JP | 2007-267294 | | 10/2007 |
| JP | 2007-282268 | | 10/2007 |
| JP | 2009-27564 | | 2/2009 |
| JP | 2009-516257 | | 4/2009 |
| JP | 2012199721 | A | 10/2012 |
| JP | 2014-112280 | | 6/2014 |
| JP | 2014-155190 | | 8/2014 |
| JP | 2015-114685 | | 6/2015 |

OTHER PUBLICATIONS

Bastan et al., "BilVideo-7: an MPEG-7—compatible video indexing retrieval system," dated Jul. 2010, pp. 62-73.
Extended European Search Report for EP Application No. 18156914.6, dated Apr. 4, 2018, 9 pgs.
Extended European Search Report for EP Application No. 18158918.5, dated Apr. 4, 2018, 9 pgs.
Stan Schneider "What's the Difference Between Message Centric and Data Centric Middleware?" dated Jul. 6, 2012, 5 pages, can be found at <http://electronicdesign.com/embedded/whats-difference-between-message-centric-and-data-centric-middleware>.
Author Unknown "Apache Kafka is a Distributed Streaming Planform. What Exacly Does that Mean?" printed on Jul. 13, 2017, 2 pages, can be found at <https://kafka.apache.org/intro>.
Author Unknown "The Log: What Every Software Engineer Should Know about Real-Time Data's Unifying Abstraction" printed on Jul. 13, 2017, 25 pages, can be found at <https://engineering.linkedin.com/distributed-systems/log-what-every-software-engineer-should-know-about-real-time-datas-unifying>.
Office Action for U.S. Appl. No. 15/447,416, dated Mar. 29, 2018, 14 pages.
Apache, "Kafka 0.9.0 Documentation," documented on archive.org as of Nov. 20, 2015, https://web.archive.org/web/20151120080338/https://kafka.apache.org/090/documentation.html, 2015, 95 pgs.
Atrey et al., "A Hierarchical Signature Scheme for Robust Video Authentication Using Secret Sharing," Multimedia Modelling Conference, 2004, Proceedings, 10th International, IEEE, 8 pgs.
Briefcam, BriefCam White Paper, White Paper; Video Synopsis Technology, 2010, 2 pgs.
Chang et al., "Robust Image Authentication Using Content Based Compression," Multimedia Systems 9, No. 2, 2003, pp. 121-130.
Dittmann et al., "Multimedia and Security," Workshop at ACM Multimedia '98, Bristol, UK, Sep. 12, 1998, 137 pgs.
Lin et al., "Detection of Image Alterations Using Semi-Fragile Watermarks," Security and Watermarking of Multimedia Contents II. vol. 3971, International Society for Optics and Photonics, 2000, 12 pgs.
Lin et al., "Video and image watermark synchronization," Center for Education and Research in Information and Security, 2005, 238 pgs.
Manaf et al., "Review of Robust Video Watermarking Methods for Copyright Protection Application," International Journal of Video & Image Processing and Network Security, vol. 16, No. 3, Jun. 2016, 8 pgs.
Milano, "Content control: Digital watermarking and fingerprinting," White Paper, Rhozet, a business unit of Harmonic Inc., May 30, 2012, 11 pgs.
Office Action for JP Application No. 2018-0326253, dated Feb. 26, 2019, 7 pgs. (with translation).
Office Action for JP Application No. 2018-032691, dated Feb. 19, 2019, 10 pgs. (with translation).
Pritch et al., Clustered Synopsis of Surveillance Video, 6th IEEE Int. Conf. on Advanced Video and Signal Based Surveillance, Sep. 2-4, 2009, 6 pgs.
Rigoni et al., "Detecting tampering in audio-visual content using QIM watermarking," Information Sciences 328, 2016, pp. 127-143.

(56) References Cited

OTHER PUBLICATIONS

Wang et al., "A Video Watermarking Scheme Based on Motion Vectors and Mode Selection," Computer Science and Software Engineering, 2008 International Conference on, vol. 5, IEEE, 5pgs.
Yang et al., "Research of Digital Watermarking Algorithm Based on SVD and DWT," Applied Mechanics and Materials, vol. 65, Trans Tech Publications, 2011, 4 pgs.
Lin, "Watermarking and Digital Signature Techniques for Multimedia Authentication and Coypright Protection," internet citation, Jan. 1, 2000, retrieved from http://citeseerx.ist.psu.edu/viewdoc/summary?doi=10.1.1.32.5211, pp. 1-258.
Office Action for JP Application No. 2019-029024, dated Feb. 20, 2020, 10 pgs. (with translation).

\* cited by examiner

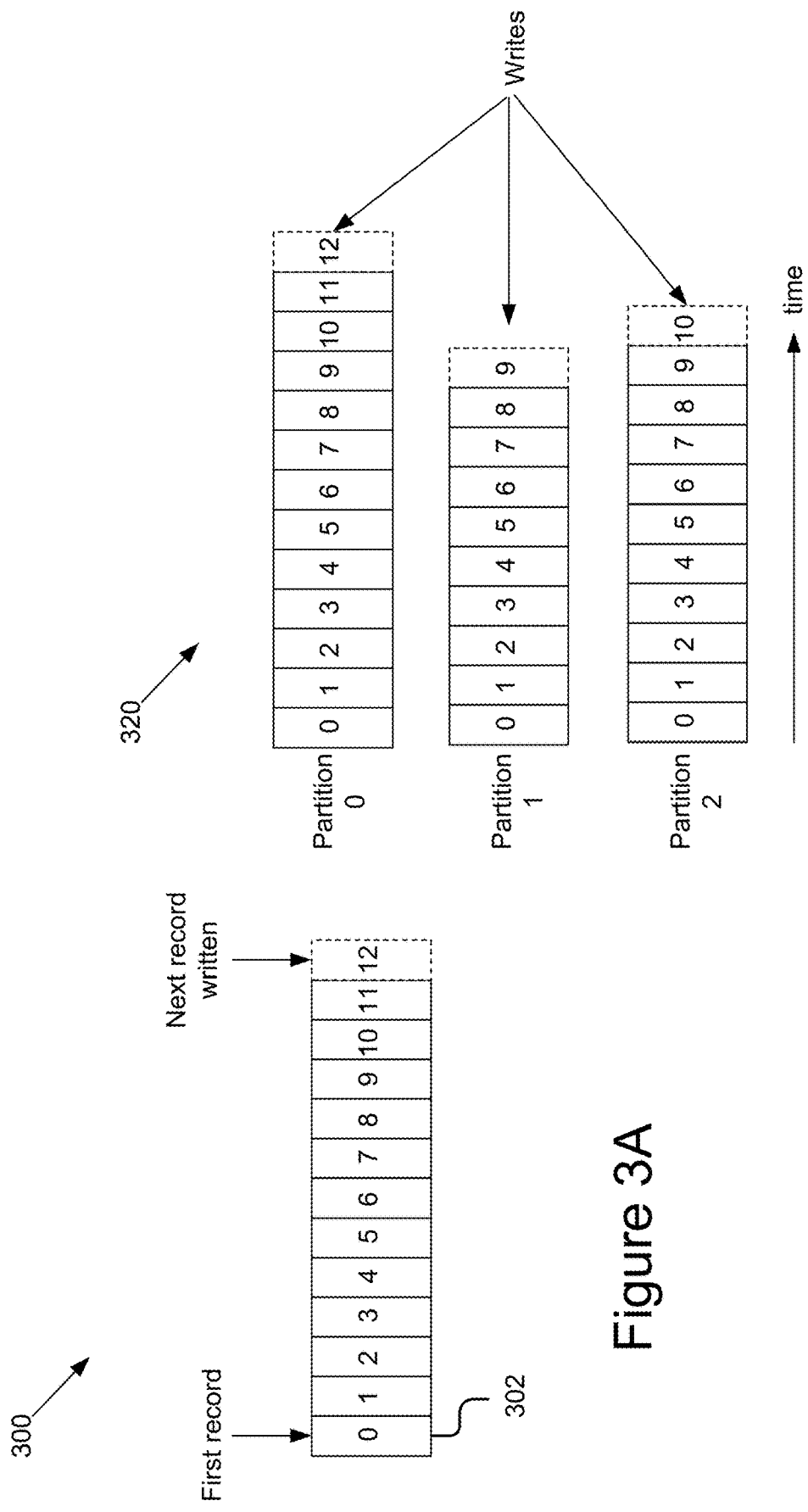

SUBSUMPTION ARCHITECTURE FOR PROCESSING FRAGMENTS OF A VIDEO STREAM

CROSS REFERENCE TO RELATED APPLICATIONS

This application is a continuation-in-part of and claims priority to U.S. application Ser. No. 15/447,416, filed Mar. 2, 2017 entitled "Decomposition of a Video Stream into Salient Fragments," which is incorporated by reference in its entirety.

BACKGROUND

1. Field of the Invention

The specification generally relates to processing a video stream. In particular, the specification relates to a system and method for distributing video segments of a video to one or more consumers based on topics and a distributed commit log associated with the topics.

2. Description of the Background Art

Historically, video surveillance has been performed using cameras to transmit a video signal to a limited set of monitors based on switching video signals (e.g., closed-circuit television systems). With the transition to the digital era video management systems (VMS) or digital video recorder distributes video streams and provides video analytics, but the video surveillance paradigm remains the same. The video analytics may be, for example, the capability of automatically analyzing video to detect and determine temporal and spatial events. However, the predominant paradigm to distribute video streams remains connection-centric and it is mainly concerned with routing video from cameras to storage and displays. As a result, the video analytics provided by the industry now follows a monolithic architecture.

The current video analytics architecture is monolithic because functionally distinguishable analytics tasks (e.g., data input and output, data processing, error handling, and the user interface) are interwoven and not separable into sub-tasks. One way to get a less monolithic architecture is edge analytics, which allows one or more analytics to be performed at the camera side or close to the camera. Edge analytics may be a form of distributed analytics, but this property on its own does not guarantee a separable design. Another solution might be a distributed system. The distributed system may be distributed in the sense that system components are located on networked computers and can communicate with each other to perform functionality; however, the distributed system can nevertheless be monolithic because it is difficult to scale with increasing number of components or rising task complexity. For example, the traditional telephone exchange system was a distributed system that was hard to expand and maintain.

The current VMS system has some other issues. For example, typical surveillance systems only contain a core analyzer whether on premise or in the cloud. In addition, current surveillance products favor a certain system deployment, i.e., enterprise-like systems where many vendors sell servers, switches, and storage to handle many cameras deployed within a same LAN or Intranet. As a result, video analytics using these surveillance products merely scale with the number of video streams within a site. More importantly, the prevailing paradigm emphasizes surveillance deployments of "few locations with many cameras" whereas deployments of "many of locations with few cameras" are underserved.

SUMMARY

The techniques introduced herein overcome the deficiencies and limitations of the prior art, at least in part, with a system and method for distributing video segments of a video to one or more consumers based on topics through the use of a distributed commit log associated with the topics. In one embodiment, the system includes one or more processors and a memory storing instructions, which when executed cause the one or more processors to decompose a video into fragments. The instructions further cause the one or more processors to break the fragments into a sequence of segments and write the sequence of segments in a distributed commit log while preserving a sequence order of the sequence of segments.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 3A and 3B depict graphical representations of example commit logs.

DETAILED DESCRIPTION

Figure 1:
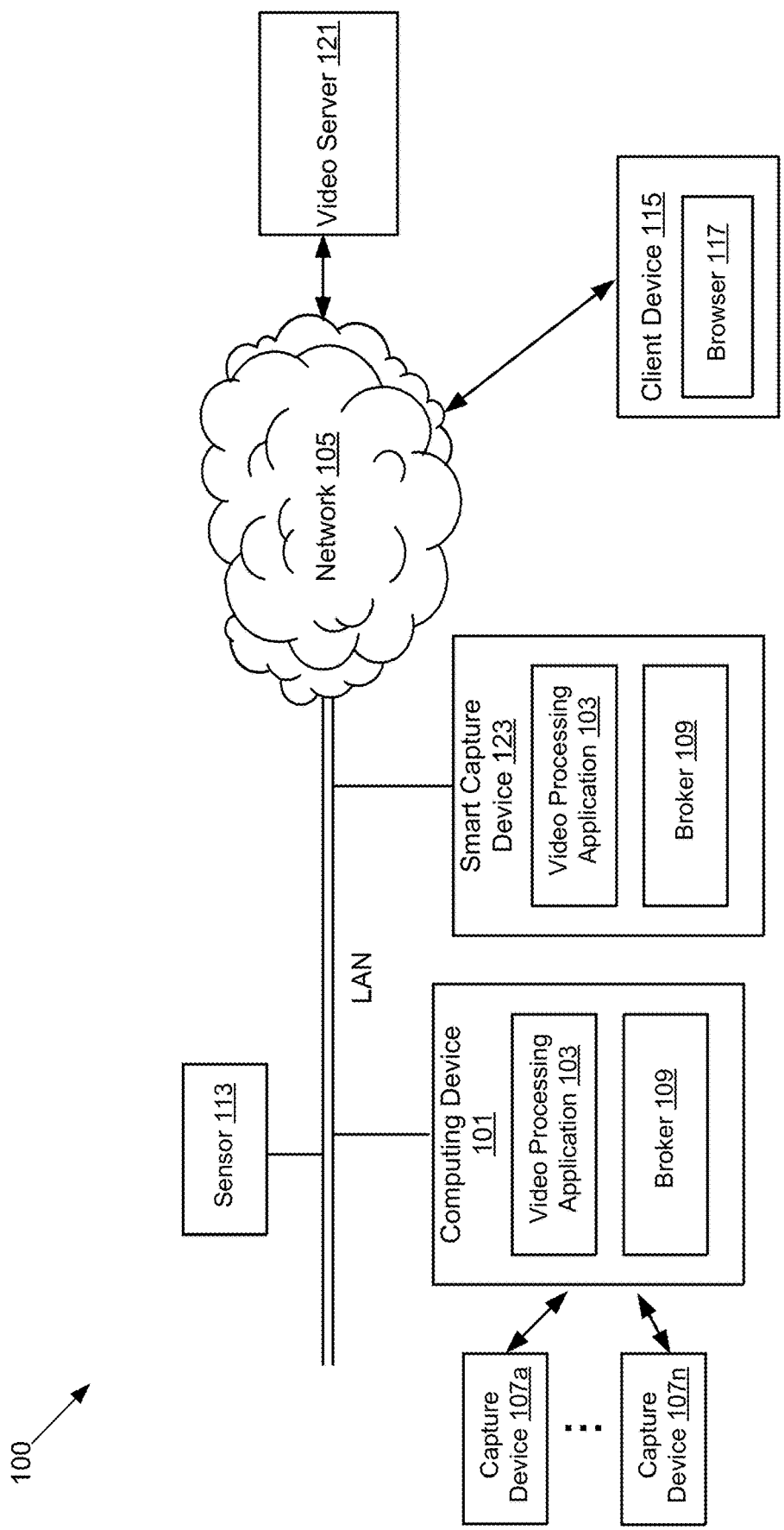
FIG. 1 depicts a high-level block diagram illustrating one embodiment of a system for distributing video segments of a video to one or more consumers based on topics through the use of a distributed commit log associated with the topics.

FIG. 1 depicts a high-level block diagram illustrating one embodiment of a system 100 for distributing video segments of a video to one or more consumers based on topics through the use of a distributed commit log associated with the topics. The illustrated system 100 includes a computing device 101, capture devices 107a . . . 107n, a smart capture device 123, a sensor 113, a client device 115, and a video server 121. In the illustrated embodiment, the computing device 101, the capture devices 107a . . . 107n, the smart capture device 123, and the sensor 113 are connected in a local area network (LAN), and are further communicatively coupled to other entities of the system 100 via a network 105. Although definite numbers of capture devices, sensors, computing devices, smart capture devices, client devices, and video servers are shown in FIG. 1, it should be understood that there may be any number of such entities. Also, such entities can be connected by any number of networks and/or LANs. Further, in FIG. 1 and the remaining figures, a letter after a reference number, e.g., "107a," represents a reference to the element having that particular reference number. A reference number in the text without a following letter, e.g., "107," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The client device 115 is a computing device including a processor, a memory, applications, a database, and network communication capabilities. For example, the client device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the video server 121, the capture device 107, the smart capture device 123, the sensor 113, or the computing device 101. In some embodiments, the client device 115 communicates with other entities of system 100 via the network 105 for providing functionality described herein. For example, the client device 115 sends a request for video content. Responsive to the request, the computing device 101 or smart capture device 123 publishes the video content and provides the video content to the client device 115 via the video server 121. Further, the client device 115 presents the video to a user and receives user input regarding a portion of the video from the user.

In some embodiments, the client device 115 includes a browser 117. The browser 117 is an application running on the client device 115 that locates, retrieves, and displays content for a user accessing the client device 115. For example, the browser 117 may communicate with the video server 121 to pull the video content using HTTP GET requests from the video server 121 for displaying to a user in response to the user's video content request.

The video server 121 may be either a hardware server, a software server, or a combination of software and hardware. The video server 121 may be, or may be implemented by, a computing device including a processor, a memory, applications, a database, and network communication capabilities. The video server 121 communicates with other entities of the system 100 via the network 105 to perform the functionality described herein. In some embodiments, the video server 121 retrieves video content from the computing device 101 or smart capture device 123, converts the formats of the video content, and provides the converted video content to a user. For example, the video server 121 may be a dynamic adaptive streaming over HTTP (DASH) server or a HTTP live streaming (HLS) server. The video server 121 reads a commit log stored on the computing device 101 or smart capture device 123 for segments of a video, and prepares the video content for adaptive bitrate streaming according to MPEG-DASH (DASH) or HLS standards. The video server 121 communicates with the client device 115 to transmit the prepared video content for display to a user accessing the client device 115. The commit log of video segments is described below with reference to FIGS. 2A and 2B.

In the illustrated embodiment, the computing device 101, the capture device 107, the smart capture device 123, and the sensor 113 communicate with each other in a LAN. In other embodiments, various computing devices 101, capture devices 107, smart capture devices 123, and sensors 113 may be connected by multiple LANs (not shown). The computing device 101, the capture device 107, the smart capture device 123, and the sensor 113 located on the same LAN or different LANs are also communicatively coupled to the video server 121 and the client device 115 via the network 105.

The capture device 107 is a hardware device that captures video and associates metadata with the video. For example, the capture device 107 can be a digital video camera, a web cam, an IP camera, etc. The video captured by the capture device 107 can be any series of time-related images. The capture device 107 associates metadata with the video, for example, a time and a location at which the video was captured, an image size, an image resolution, color depth, a frame rate, etc.

The smart capture device 123 is a capture device similar to capture device 107 that is also capable of invoking applications, running software programs, or performing other analytics logic. For example, a smart capture device 123 may run a video processing application to perform image recognition on the captured video. In some embodiments, the smart capture device 123 performs the video processing functions of the computing device 101 running video processing application 103 and broker 109, described below.

The sensor 113 is a hardware device that detects and responds to input from a physical environment. The sensor 113 is coupled to the LAN and/or the network 105 to provide information or signals about the physical environment. Although it is not shown in FIG. 1, as described above, a single sensor, a series of sensors, or a grid or array of sensors may be located in different LANs and coupled to the network 105. The sensor(s) can be a beacon for detecting the location and orientation of a user. For example, the sensor(s) may be a global positioning system (GPS) sensor, a Wi-Fi sensor, a micro electro mechanical system (MEMS) sensor, a Bluetooth beacon such as a Bluetooth low energy (BLE) beacon, an ultrasonic beacon, a depth sensor, a video camera, a sensor using cellular positioning, near field communications, video location, and other positioning techniques. Other types of sensors may include, but not limited to, a motion sensor such as a gyroscope, a proximity sensor, a radio frequency (RF) detector, an accelerometer, an ambient light sensor, a thermal sensor, a biometric sensor, etc.

The computing device 101 is a hardware device/server that performs video analytics on a video stream. In some embodiments, the computing device 101 connects with the capture device 107 to receive a video stream for performing video analytics. In some embodiments, the computing device 101 connects to a single capture device or connects multiple capture devices. The computing device 101 receives an input video stream from the attached capture device 107, and generates output video content, e.g., selected video segments as described below, based on processing the input video stream.

In some embodiments, the computing device 101 is capable of invoking applications and running software programs to perform video analytics on content management, deployment management, etc. For example, the computing device 101 may use an application to manage the video content based on identification, correlations, aggregations, filtering, and sampling, etc. The computing device 101 may identify features from the video stream, recognize objects from the video stream based on the features, and select portions of the video stream to generate rich video content. The computing device 101 may also run an enhancer program to improve the quality of the video stream. In another example, the computing device 101 may provide a solution for deployment management by automating the workflow from recording to publishing, i.e., automatically identifying an appropriate source (e.g., a particular capture device) to obtain video records, and routing to an appropriate destination (e.g., a topic) to publish video content derived from the video records.

In some embodiments, the computing device 101 and/or a smart capture device 123 include a video processing application 103 and a broker 109. In some embodiments, the video processing application 103 and the broker 109 can be implemented using programmable or specialized hardware. In some embodiments, the video processing application 103 and the broker 109 can be implemented using a combination of hardware and software. In other embodiments, the video processing application 103 and the broker may be software stored and executed on the computing device 101 and/or smart capture device 123.

In some embodiments, the video processing application 103 and the broker 109 (described below) of the computing device 101 and/or smart capture device 123 may include middleware for data centric communication that mediates the rules for the structure, access to, and modification of data. In some embodiments, the data-centric middleware includes, but is not limited to, Real-Time Innovations (RTI) data distribution service (DDS), Open Splice DDS, Amazon Kinesis, Apache Kafka, etc. For example, the video processing application 103 and the broker 109 of the computing device 101 and/or smart capture device 123 may use Apache Kafka as the data distribution platform to generate video data, process the video data sequentially and incrementally record-by-record or over sliding time windows, and perform a wide variety of analytics (e.g., correlations, aggregations, filtering, sampling, etc.) on the video data.

In some embodiments, the video processing application 103 receives a video from a capture device and decomposes the video into fragments. In some embodiments, the video processing application 103 determines saliency of objects based on at least one of motion detection, contrast, color, and semantic properties, and decomposes a video into fragments based on the saliency. A salient fragment of the video is a subset of frames of the video and a subset of pixels from the subset of frames. For example, pixels corresponding to an object in the video may be found in multiple frames of the video. These frames with the pixels corresponding to an object may be extracted from the video as a subset of frames. Further, the pixels corresponding to the object (and in some embodiments, some pixels surrounding the object) are extracted from each of the subset of frames. The resulting subset of frames including only the pixels associated with the object are a salient fragment.

The video processing application 103 groups salient fragments into topics. A topic is a category to which records (e.g., video content) are published. The video processing application 103 may associate an exclusive topic with a single video fragment, assign a video fragment to multiple topics, assign different video fragments to a single topic, or associate a single continuous fragment of an entire video stream with a singleton topic.

The video processing application 103 assigns the distribution of the video fragments to brokers and/or servers based on sharding the fragments by topic. In some embodiments, the video processing application 103 may shard the topics themselves, and distribute the sharded topics and fragments to separate brokers and/or servers. For example, the video processing application 103 splits a topic into partitions, and assigns each partition of the topic to a different broker.

The video processing application 103 also breaks fragments into segments (e.g., a sequence of standalone short clips) and publishes the segments into corresponding topics. In some embodiments, the video processing application 103 associates each partition of a topic with a commit log and writes each record of the commit log with a sequence of video segments. In some embodiments, the commit log is an append-only, ordered sequence of records. The video processing application 103 appends records to the end of the commit log, and assigns each entry of the records a unique sequential entry number or timestamp.

The broker 109 manages a distributed commit log (i.e., a collection of one or more commit logs distributed throughout the system 100). For example, the broker 109 updates the records and metadata associated with commit logs for which the broker 109 is responsible in the distributed commit log. In some embodiments, one or more brokers form a local cluster, and the local cluster manages the distributed commit log. In addition, the broker 109 also communicates with the video processing application 103 and other components of the system 100 to retrieve data from the log and provide the data to a user. Specifically, the distributed commit log plays an important role in the new data-centric architecture of video analytics that allows the subsumption of sub-tasks under larger or more comprehensive analytics tasks described herein. The operation of the video processing application 103, the broker 109, and the functions listed above are described below in more detail with reference to FIGS. 2A-10.

The prevailing paradigm for video analytics is designed based on criteria similar to those of a video communication system, uses protocols such as open network video interface forum (ONVIF) based on real-time transport protocol (RTP) for delivering video over internet protocol (IP), exchanges information with the core abstraction being the video stream, has transmission latencies comparable to the latencies in teleconferencing, and is usually applied in scenarios of a few "video consumers" (e.g., human). For video analytics, this prevailing paradigm has some problems. For example, this paradigm exposes the methods but no the content of a data object (e.g., playback methods for a video stream while encapsulating the media content), does not scale with the number of data consumers, and stores event metadata separately from video. Also, it is very difficult to integrate the prevailing paradigm with business models. Furthermore, this prevailing paradigm completely disregards big data practices concerning governance, and data management.

The techniques described herein provide a new data-centric architecture for video analytics that allows the subsumption of sub-tasks under larger or more comprehensive analytics tasks. This alternative paradigm improves on the existing paradigm by achieving: (1) data integration—data is easily available to different storage and processing systems; (2) real-time data processing—data streams can be derived from the analysis of other streams; and (3) distributed design—simplified design of complex video analytics. The techniques described herein therefore are advantageous in many aspects. First, this new data-centric architecture is no longer monolithic because the architecture clearly distinguishes the analytic tasks into sub-tasks (i.e., tasks are divided into simpler sub-tasks). Second, it is easy to scale the new data-centric architecture by increasing the number of components or increasing task complexity. Third, the new data-centric architecture fits different deployments, in particular, the deployments of "many locations with few cameras." In addition, with this new data-centric architecture, more complex video analytics can be performed with reduced computer and network resources.

Figure 2A:
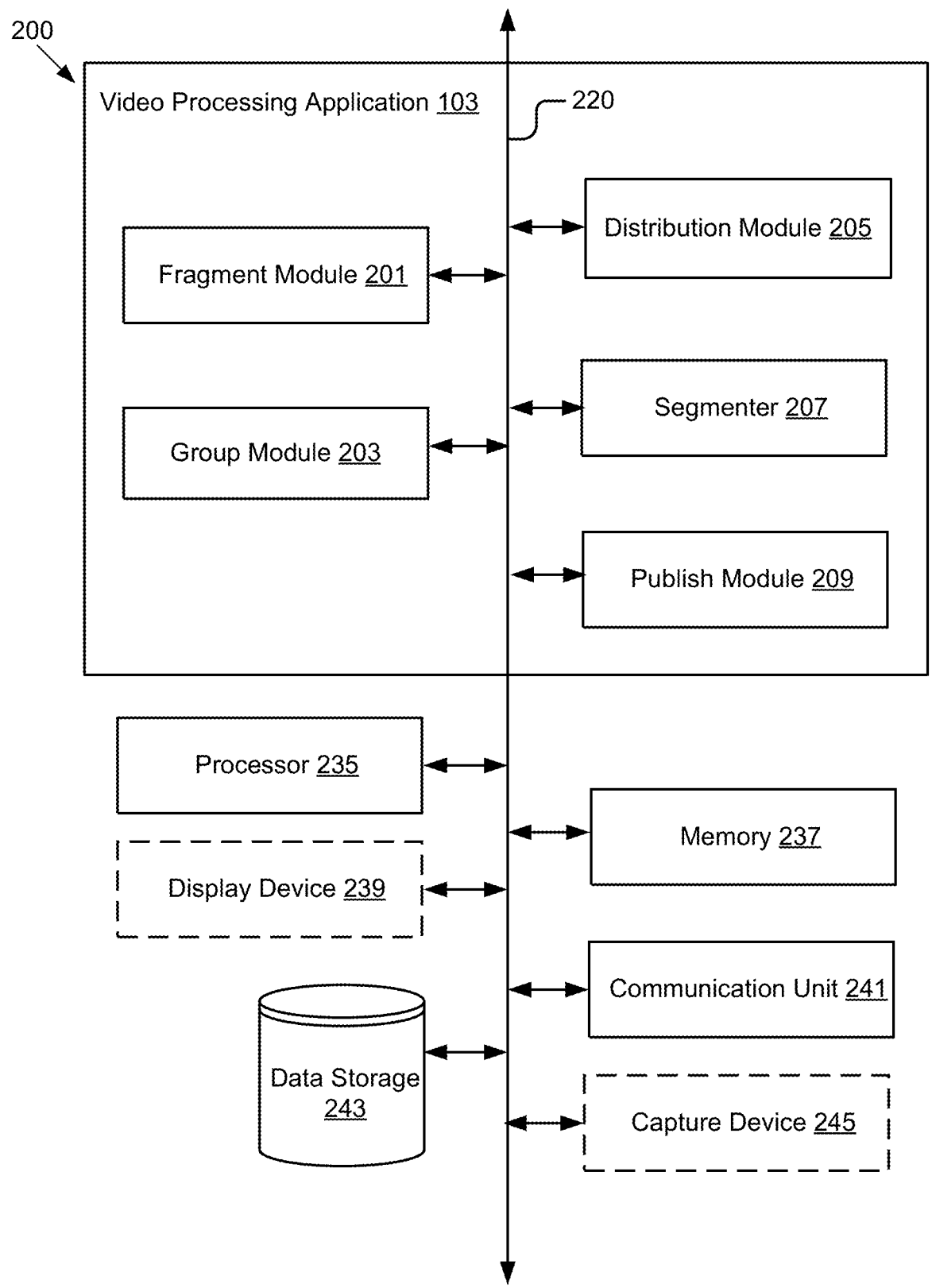
FIG. 2A depicts a block diagram illustrating one embodiment of a connect box including a video processing application.

FIG. 2A depicts a block diagram illustrating one embodiment of a system 200 (e.g., computing device 101 or smart capture device 123) including a video processing application 103. The system 200 may also include a processor 235, a memory 237, an optional display device 239 and capture device 245, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 237 via the bus 220 to access data and instructions therefrom and store data therein. The bus 220 may couple the processor 235 to the other components of the system 200 including, for example, the memory 237, the communication unit 241, the video processing application 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one embodiment, the memory 237 may store the video processing application 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2A with dashed lines to indicate it is optional. For example, the system 200 may be a server for performing video content analysis without a display device 239 or a smart capture device without a display.

The communication unit 241 is hardware for receiving and transmitting data by linking the processor 235 to the network 105 and other processing systems. The communication unit 241 receives data for processing. For example, the communication unit receives video data from the capture device 107 for processing by the video processing application 103. The communication unit 241 may also transmit information to a client device 115 for display. For example, the communication unit 241 receives a request for video content from a user of the client device 115, and transmits the video content to the client device 115 via the video server 121. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the client device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220 to receive data for storage and provide data for retrieval upon a request for the data. The data storage 243 may store a video, fragments of the video, topics associated with the fragments, a distributed commit log, etc.

The capture device 245 is a hardware device that captures video and associates metadata with the video. For example, the capture device 245 can be a digital video camera, a web cam, an IP camera, etc. The video captured by the capture device 245 can be any series of time-related images. The capture device 245 associates metadata with the video, for example, a time and a location at which the video was captured, an image size, an image resolution, color depth, a frame rate, etc. The capture device 245 is coupled to the bus 220 for communication with the processor 235 and the other components of the system 200. It should be noted that the capture device 245 is shown in FIG. 2A with dashed lines to indicate it is optional. For example, the system 200 may be a server for performing video content analysis connected to a remote capture device 107 or a smart capture device 123 that includes an integrated capture device 245.

In some embodiments, the video processing application 103 includes a fragment module 201, a group module 203, a distribution module 205, a segmenter 207, and a publish module 209.

The components of the video processing application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The fragment module 201 may include software and/or logic to provide the functionality for decomposing a video into fragments. The video can be any series of time-related images. A fragment or fragment sequence is a subset of the video that includes multiple time-related images or frames of the video. Each frame of the fragment at a time instant includes a particular region that is slightly different and is connected in a certain continuity. For example, a salient fragment may include three time-related frames of an activity of waving hands. The first frame shows that a man is raising a hand to a first position. The second frame shows that the man is waving the hand at the first position. The third frame shows that the man is lowering the hand to a second position. A single salient fragment does not necessarily include a dramatic change of the particular region. That is, a salient fragment represents a sequence of small and/or steady changes in activity. Once the dramatic change occurs, for example, the region gets fractured, occluded, etc., a new salient fragment starts. For example, the salient fragment described above includes only three frames because the fourth frame that follows the third frame in the video does not contain the man's hand. In other words, a salient fragment is an atom of the original video that starts when a block of pixels appears in a scene and ends when the block of pixels disappears from the scene. In some embodiments, the fragment module 201 may include an encoder to perform the functionality described herein.

In some embodiments, the fragment module 201 determines saliency of objects, extracts salient objects from the video based on the saliency, and generates a plurality of salient fragments based on the salient objects. The saliency represents a pronounced feature of the video, and the corresponding salient fragment is a highlight of the video with noticeable quality that shows the pronounced feature. For example, the fragment module 201 extracts, from a surveillance video, a salient fragment including movements of a suspect, based on the most pronounced feature being a blacklisted individual (i.e., the salient object).

In some embodiments, the fragment module 201 determines saliency of objects in a video based on at least one of motion detection, contrast, color, and semantic properties. A salient object therefore may be an object that is moving or an object that is of certain color or certain contrast. The salient object may also be an object with semantic significance. For example, for a conversation video, the fragment module 201 may determine the person who did the most talking (e.g., answers other people's questions) as a salient object based on the semantic significance. Or, for example, the fragment module 201 may determine a car with a certain label as an object with semantic significance.

In some embodiments, the fragment module 201 uses a background and foreground separation method based on motion detection to identify a moving object as a salient object. For example, the fragment module 201 extracts a salient object of a train heading to a train station (e.g., the fast-changing portion) from a video, or the fragment module 201 identifies a moving object that is not in a predomination flow of moving objects in the video as a salient object. Motion detection methods may not be applicable in extracting salient objects when there are numerous moving objects in a scene, for example, a busy highway, a crowded store, etc. In such cases, the fragment module 201 may determine a salient object based on other characteristics of the video such as the contrast, the color, the shape, the semantic information of the video, etc. For example, the fragment module 201 identifies a person riding a bike as a salient object based on the semantic information including activities performed by objects in the video. The algorithms used in identifying salient objects include a Gaussian Mixture Models (GMM) based algorithm, a visual background extractor (ViBe), an adaptive GMM, a self-organizing map algorithm, a principal component analysis algorithm, an algorithm based on low-rank decomposition for modelling background, etc.

Once a salient object is determined, the fragment module 201 links the related portions of the salient object to generate a fragment. In some embodiments, the fragment module 201 determines salient objects in each frame of the video, tracks each salient object over the length of the video, and generates a plurality of fragments based on the tracks. A simple way to track the salient object is to locate the position of the salient object from one frame to another frame, and associate the salient object in one frame to the salient object in the next frame that appears at a similar spatial location. However, this simple tracking method has some problems such as overlapping objects, false detection and resulted lack of association between objects, etc. To solve the problems, the fragment module 201 may use a tracking algorithm that associates a specific color model and/or a motion vector model to a salient object to obtain a track of the salient object over time. In some embodiments, the fragment module 201 applies a Hungarian method to determine when to start and stop tracks, and uses a Kalman filter method to implement multiple object tracking.

In some embodiments, the fragment module 201 defines a track of a salient object as a fragment. This video fragment includes only the salient portion of the video and lasts for the time duration of the track, and is therefore also referred to as a salient fragment. The salient fragment is a portion of the video for a single salient activity localized in time and space. In some embodiments, the fragment module 201 tracks a single salient object within a certain time period of the video, and generates a single salient fragment from this specific time period. In other embodiments, the fragment module 201 tracks multiple salient objects within a certain time period of the video, and generates multiple salient fragments from this specific time period of the video. For example, the fragment module 201 may track, from a three-minute period of the video, a person and a car, and generate a first fragment of the person and a second fragment of the car.

Once the fragments are determined, the fragment module 201 communicates with other components of the video processing application 103 to build a database of fragments. In some embodiments, a database index is built in the database of fragments for fast data retrieval based on a spatio-temporal overlap or causality information of the fragments. In other embodiments, the fragment module 201 may also communicate with other components of the video processing application 103 and the broker 109 to identify and provide video content to a user.

The group module 203 may include software and/or logic to provide the functionality for grouping fragments of a video into topics. A topic is a category to which records (e.g., video content) are published.

When a video stream is processed, it may be considered as a set of data objects instead of a data flow. For example, each fragment of the video may be a data object in a global database, and the evolution of each fragment may be an update. In some embodiments, the group module 203 associates a fragment (e.g., a data object) of a video received from the fragment module 201 with a unique identifier in a namespace. For example, the group module 203 assigns a name or a locator to a fragment.

Based on the assigned identifiers, the group module 203 groups the fragments into topics. In some embodiments, the group module 203 associates a single fragment with an exclusive topic, i.e., no other fragments will be classified into this topic. In other embodiments, the group module 203 assigns a fragment to multiple topics. For example, the group module 203 assigns a fragment to topic "camera A" based on the fragment being received from a camera located at a specific LAN, and assigns the fragment to the topic "bicycles" based on the fragment containing a salient object of a bicycle. In some other embodiments, the group module 203 groups multiple video fragments to a single topic. For example, the group module 203 may group the fragments of a video from one capture device into a single topic. In one embodiment, the group module 203 may be a multiplexer that identifies, from videos of a set of cameras, the video originating from a first camera, and multiplexes the identified video fragments into a topic "video-stream-01." In some other embodiments, the group module 203 groups the fragments of the video from the same capture device into multiple topics. In some other embodiments, the fragment module 201 extracts a single fragment from the entire video stream, and the group module 203 groups the fragment representing the entire video into a singleton topic (e.g., "video-stream-01") because this topic both contains a single data object and is interchangeable with the single object.

The distribution module 205 may include software and/or logic to assign the distribution of the fragments of the video to brokers and/or servers. In some embodiments, the distribution module 205 may distribute the fragments of the video based on sharding the fragments by topic. In databases, sharding is a horizontal partitioning of data in a way that each partition is kept on a separate server or broker at different physical locations. Thus, sharding not only splits tables of a database into one or more tables by row as in horizontal partitioning, but also spreads the pieces of the table across separate instances of the database and schema. Sharding therefore spreads the load of data processing. The idea of sharding is not exclusive to tables. A dataspace (or one of its subsets) can also be horizontally partitioned or sharded to ensure that no individual data objects are split. Sharding is therefore applicable to data-centric communications, where each shard is handled by separate servers or communication brokers to achieve scaling.

In some embodiments, the distribution module 205 spreads topics along with the associated fragments amongst different servers or brokers according to a naming scheme. For example, the group module 203 groups a first set of fragments of a video from a first camera under a topic "local-presence-stream-001" based on a unique name assigned to each fragment of the first set. The distribution module 205 identifies the prefix "local" in the topic of "local-presence-stream-001," and determines to distribute the topic and associated first set of fragments to be handled by a first broker. The first broker is on the same LAN with the first camera. On the other hand, the distribution module 205 may determine to distribute topics with the prefix "wide" and associated fragments to a different broker (e.g., a remote broker in the cloud). So, if the group module 203 groups a second set of fragments of the video from the first camera into a "wide-presence-stream-001," the distribution module 205 would distribute the second set of fragments to a second broker that is located in a different LAN. In some cases, even fragments from a same capture device may be classified into both topics labelled "local" and topics labelled "wide" because data aggregation from multiple LANs is required when handling certain portions of the video (e.g., the second set of fragments described above), and thus corresponds to a topic labelled "wide." A person of ordinary skill in the art will recognize that many other naming schemes for fragments and topics are possible.

In other embodiments, the distribution module 205 may shard the topics themselves, and spread the sharded topics and fragments to separate brokers and/or servers. For example, the distribution module 205 may split a topic into partitions, and assigns each partition of the topic to a different broker. The partition of topics and fragments will be described in detail below with reference to the publish module 209.

It is advantageous to assign the distribution of fragments to brokers based on topics. First, since the distribution module 205 assigns topics and associated data (e.g., fragments) to the brokers according to the naming schemes, producers and consumers of the data do not need to know or be concerned with the location of other participants or specific brokers for the data distribution. Second, by sharding topics, the distribution module 205 distributes the fragments with increased throughput.

The segmenter 207 may include software and/or logic to provide the functionality for breaking fragments into segments. A segment is a sequence of standalone short clips. In some embodiments, the segment is of fixed duration, e.g., one second, five seconds, etc. In other embodiments, the segment is of varying length, e.g., a first segment is two-seconds long, a second segment is six-seconds long, etc. In some other embodiments, each segment corresponds to an individual frame in the video.

The segmenter 207 receives fragments of a video from the distribution module 205. In some embodiments, the segmenter 207 may include a decoder to decode the received encoded input video fragments, and split the decoded video fragments into segments. In other embodiments, the segmenter 207 may perform the segmenting without transcoding, i.e., segmenting may be implemented without decoding the video and re-encoding the video using the same video codec. For example, the segmenter 207 receives the input video that is encoded with I-frames (e.g., key frames) aligning with the segment splits, and splits the video into segments without having to decode its contents. This "muxing without transcoding" simplifies the segmenting because it only changes the encapsulation of the video without touching the encoded contents.

The publish module 209 may include software and/or logic to provide the functionality for publishing segments into corresponding topics. In some embodiments, the distribution module 205 may divide a topic into partitions. The publish module 209 may receive the partitions and associate each partition with a commit log. In one embodiment, a commit log is an append-only, ordered sequence of records. In some embodiments, the publish module 209 appends records to the end of the commit log, and assigns each record a unique sequential entry number or timestamp. For example, the entry number is an offset that indicates the position of a record in the partition. Because the publish module 209 appends the latest record to the end of the commit log, the commit log defines a notion of time without relying on any particular physical clock. The publish module 209 therefore stores the changes or updates of the underlying data object, i.e., a commit history, to the commit log.

FIG. 3A depicts an example commit log 300 that is associated with a single partition of a topic. The publish module 209 writes the first record in the first position 302 of the log as labelled by an offset "0." The publish module 209 then appends the sequence of records to the log in an order of continually increased offset numbers. In the example of FIG. 3A, the publish module 209 has filled the first 12 positions of the log, i.e., offset "0" through offset "11," with 12 records, and would append the next or most recent record to offset "12." FIG. 3B depicts an example commit log 320 that is associated with multiple partitions. The multiple partitions may be from one or more topics. The publish module 209 may write a record to each partition, for example, writing a first record to offset "12" of partition 0, writing a second record to offset "9" of partition 1, and writing a third record to offset "10" of partition 2.

In some embodiments, the records written or published in a commit log by the publish module 209 are video segments received from the segmenter 207. FIG. 3C depicts a block diagram 350 illustrating one embodiment of a method for segmenting video fragments and publishing the segments to a corresponding topic. An encoder included in the fragment module 201 of the video processing application receives the video fragment 352. The encoder encodes the video I-frames aligned with the desired segments splits. The encoded fragment is sent to a "muxing" block that changes the encapsulation of the video to the MPEG-TS digital container format without transcoding. This "muxing" step produces a sequence of standalone clips with the desired segment splits. The segmenter 207 assigns the standalone short clips to different segments, i.e., segments 0, 1, 2, . . . n. Each segment is considered an update of the same data object representing video fragment 352. The segments are then published by the publish module 209 into the topic. As depicted in FIG. 3C, the publish module 209 publishes the segments in the commit log 354. The commit log 354 includes a partition associated with the topic. The publish module 209 publishes or writes segment 0 in the offset "0," segment 1 in the offset "1," segment 2 in the offset "2," and so on. As a result, the partition is an ordered and immutable sequence of records. It is noted that consumers can also access the video segment as indicated in items 356 and 358. This data access will be described in more detail below with reference to FIG. 2B.

In some embodiments, the publish module 209 may communicate with the distribution module 205 to publish video segments to a remote topic. For example, the publish module 209 of the computing device 101 may publish video segments to a remote topic if the topic is to be distributed by a remote. A person skilled in the art will recognize that records other than video segments can also be published by the publish module 209 into a topic.

Figure 2B:
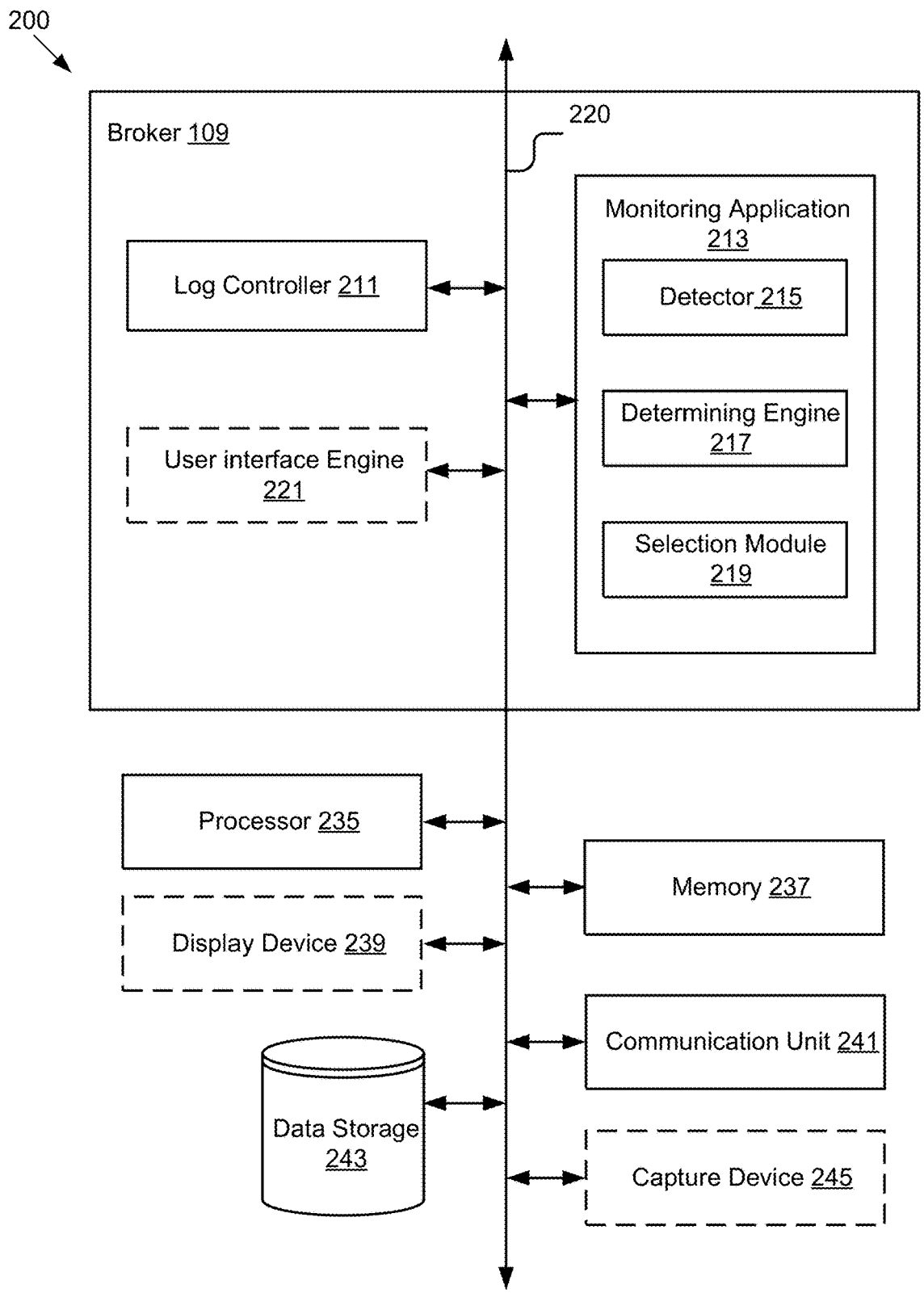
FIG. 2B depicts a block diagram illustrating one embodiment of a connect box including a broker.
Figure 3C:
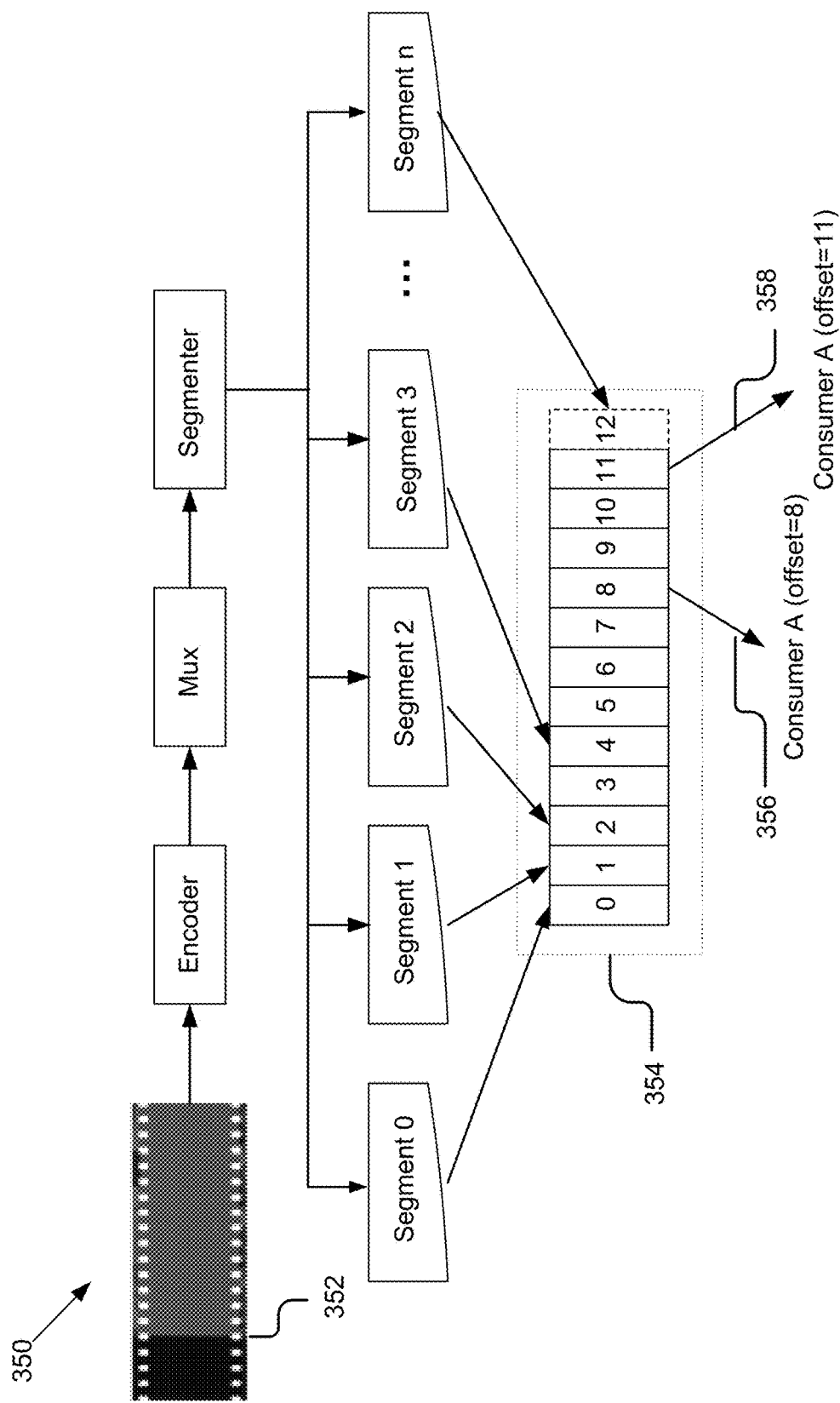
FIG. 3C depicts a block diagram illustrating one embodiment of a method for segmenting video fragments and publishing the segments to a corresponding topic.

FIG. 2B depicts a block diagram illustrating one embodiment of a system 200 including a broker 109. The other components of the system 200 including the processor 235, the memory 237, the display device 239, the communication unit 241, data storage 243, and capture device 245 have been described with reference to FIG. 2A, and will not be repeatedly described here.

In some embodiments, the broker 109 includes a log controller 211, a monitoring application 213, and a user interface engine 221.

The log controller 211 may include software and/or logic to provide the functionality for managing a distributed commit log (i.e., a collection of one or more commit logs distributed throughout the system). Responsive to receiving video segments published into a commit log associated with a topic from the publish module 209, the log controller 211 of the broker 109 stores the commit log (e.g., on the data storage 243), and manages the commit log. Since the publish module 209 publishes a sequence of video segments by appending the latest segment to the end of the commit log and associates each entry with a timestamp, the log controller 211 stores the sequence of segments associated with a topic in the log while preserving a sequence order of the sequence of segments.

In some embodiments, an instance of the broker 109 runs on each computing device 101 and each smart capture device 123 in a local area network (LAN). For example, an instance of the broker 109 runs on the computing device 101 and the smart capture device 123 in FIG. 1. In some embodiments, the instances of brokers 109 in a local environment of a LAN form a local cluster at the LAN. The local cluster manages the distributed commit log, which includes the one or more commit logs managed by each broker in the cluster.

Figure 4:
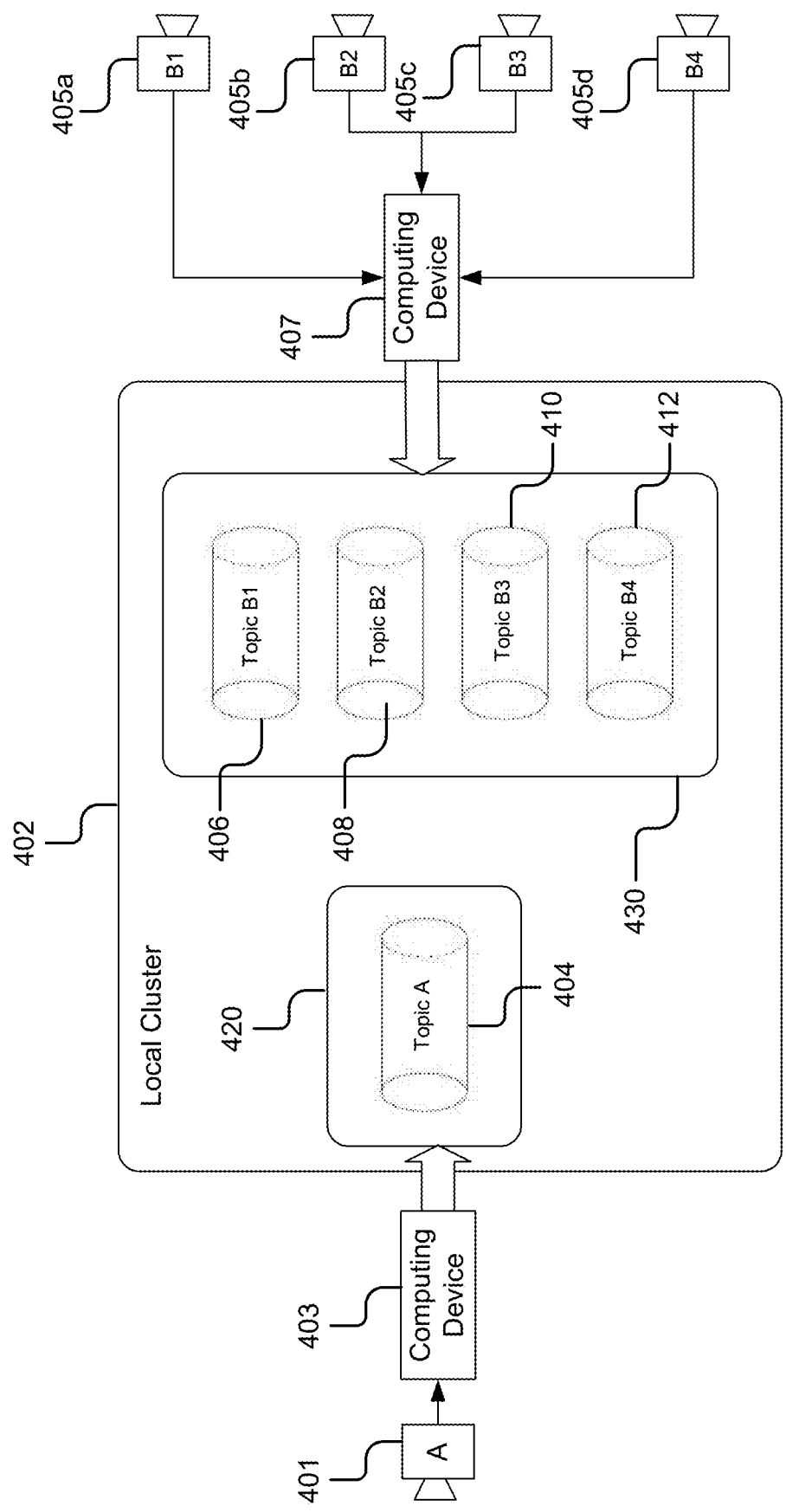
FIG. 4 depicts a graphical representation of a local cluster including one or more brokers.

FIG. 4 depicts a graphical representation of a local cluster 402 including one or more brokers. As depicted in FIG. 4, a passive capture device 401 is attached to a computing device 403, and four passive capture devices (e.g., cameras 405a-405d) are connected to computing device 407. While passive capture devices connected to computing devices for processing are illustrated in the example of FIG. 4, it should be understood that smart capture devices running instances of the broker may be included in the local cluster. Broker 420 running on computing device 403 and broker 430 running on computing device 407 form a local cluster 402. Capture device 401 and capture devices 405 may be deployed at different locations in the local environment depending on the area that is surveilled, monitored, and analyzed. Broker 420 and broker 430 may be two instances of the broker 109. In some embodiments, a broker handles the data from the nearest capture device. For example, broker 430 can handle the video content captured by capture device 401 and broker 420 can handle the video content captured by capture devices 405a-d. That is, the broker in one device can assist with the distribution of content captured by any capture device in the system. Based on the data received from the capture devices, a log controller 211 of a broker in the cluster manages at least one commit log. For example, the log controller 211 of broker 420 manages a partitioned log 404 associated with topic A, while the log controller 211 of broker 430 manages partitioned logs 406, 408, 410, 412 associated with topics B1 to B4. As a result, the local cluster 402 manages a collection of distributed commit logs including partitioned logs 404-412 stored in data storage 243 of computing device 403 and computing device 407.

The log controller 211 manages the distributed commit log to ensure the validity, availability, and accessibility of data stored in the log. In some embodiments, the log controller 211 updates the records of the distributed commit log. For example, the log controller 211 stores and updates the distributed commit log with a video segment published to the log by the publish module 209. In some embodiments, the log controller 211 assigns a retention period to the records (e.g., video segments) of the distributed commit log, and updates the log based on the retention period. Accordingly, the log controller 211 retains all published records up to a configurable retention period and updates the log with the new data written by the publish module 209. In other embodiments, the log controller 211 updates the metadata associated with the distributed commit log. The metadata retained on a per-consumer basis includes an offset or position of a consumer in the log. A consumer is a user that subscribes to the topic associated to the log and accesses (e.g., reads) the log history. The offset of the consumer in the log controls the order in which records are consumed by the consumer. Referring to FIG. 3C, for example, consumer A can reset to an older offset by skipping ahead to a more recent record, and thus read the video segment at offset "8" as indicated in item 356. On the other hand, consumer B simply moves to the most current record—the "head," and thus reads the video segment at offset "11" as indicated in item 358. The log controller 211 retains the offset of each consumer and updates this offset when a consumer changes it. A person skilled in the art will recognize that there are other metadata associated with the log and updated by the log controller 211.

Figure 5:
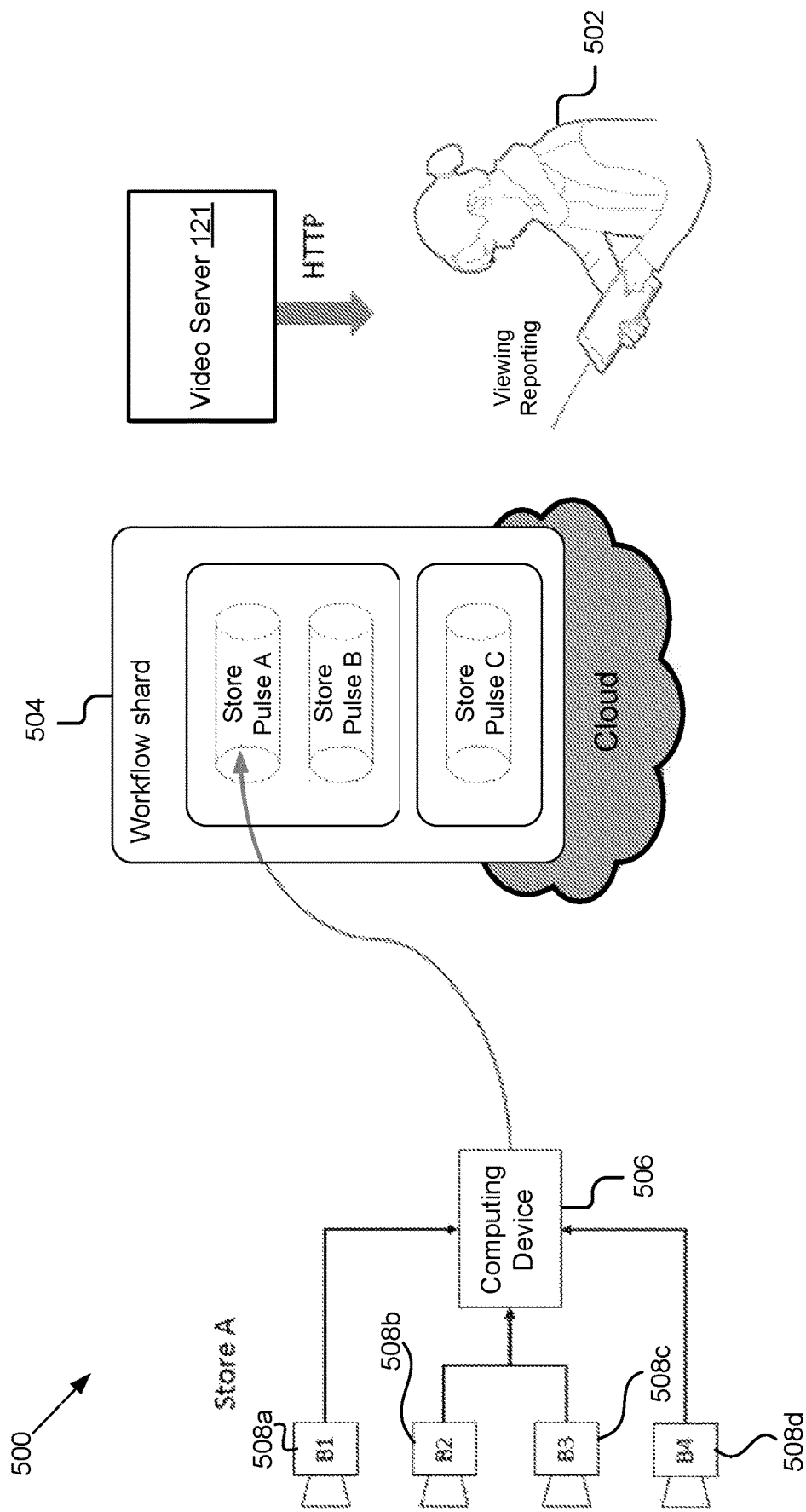
FIG. 5 depicts a block diagram illustrating one embodiment of a method for retrieving data from a distributed commit log and providing the data for a requesting user.

In addition to updating the records and metadata associated with the log, the log controller 211 also communicates with the other components of the system 200 to retrieve data from the log and provide the data to a user. FIG. 5 depicts a block diagram 500 illustrating one embodiment of a method for retrieving data from a distributed commit log and providing the data for a requesting user 502. Potential enterprise users (e.g., store managers, bankers, etc.) often need to access information of many different sites (e.g., stores, banks, etc.) that are connected to different LANs. It is typical that these users are interested in some analytics workflow common to all the sites. For example, a workflow may provide a regional store manager 502 with access the remote feed of cameras at different store locations within her purview. The remote feed can be a live broadcast from a selected camera, a synopsis, or a short clip (e.g., a six-second looping video). Accessing information of a store through the workflow is not a two-way communication with the store, and therefore latencies of a few seconds are acceptable. However, the communication safety is guaranteed because the computing devices or smart capture devices in this environment have a secure connection to the cloud or the network.

In the example of FIG. 5, there is a topic for every store location, and the topics are grouped into a single workflow shard 504 corresponding to the workflow for one enterprise customer. When the regional manager 502 selects a capture device (e.g., one of the capture devices 508a-508d) at Store A using a tablet device connected to a web service via a web browser, the video server 121 sends a signal to the appropriate computing device or smart capture device 123 (e.g., computing device 506 at store A), to instruct the computing device 506 to publish segments into the corresponding remote topic "Store Pulse A". For example, the fragment module 201 of computing device 506 decomposes a video stream received from the selected capture device into fragments. The group module 203 of the computing device 506 associates the fragments with the topic "Store Pulse A." The segmenter 207 of the computing device 506 splits the fragments into segments. The publish module 209 of the computing device 506 communicates with the distribution module 205 of the computing device 506 to publish the segments into the remote topic "Store Pulse A," which is not stored in a commit log of the computing device 506 by the log controller 211. Instead, a log controller of a broker running on a cloud device stores the commit log remotely.

Once the segments are published into the topic "Store Pulse A" associated with a commit log, the video server 121 already subscribed to topic "Store Pulse A", receives updated records and prepares the video for adaptive bitrate streaming according to MPEG-DASH or HTTP Live Streaming (HLS) standards, both of which are based on video segments. The web browser at the tablet then pulls the segments using HTTP GET requests from the video server 121 for display to the regional manager 502.

In some embodiments, the corresponding shard for the workflow of one enterprise customer can be handled by a set of brokers and server instances that are separate from the computing device 506, for example, brokers and servers in either a data center or cloud-computing service that offers on-demand computing (e.g., Amazon Web Services). Or the shard may be handled by the brokers of the computing device 506 and other computing devices or smart capture devices in a local cluster. For example, the group module 203 of the computing device 506 determines a topic for every store location, communicates with the distribution module 205 to group the topics into a single workflow shard 504 corresponding to the workflow for the enterprise customer, and assigns topics to be managed by a different broker of another computing device in the cluster. Such mechanisms of distributing the sharded topics and fragments to separate brokers and/or servers allows provisioning of separate computational resources for one user in order to spread loads or satisfy data governance constraints and improve performance.

It is not necessary to have one broker per topic. In the example of FIG. 5, topics "Store Pulse A" and "Store Pulse B" are handled by a first broker and topic "Store Pulse C" is handled by a second broker. In general, each broker can handle multiple topics. Topics can also be partitioned into different brokers to increase throughput or fault-tolerance. Such a scheme is also advantageous for better utilization of computational resources.

Referring back to FIG. 2B, the monitoring application 213 may include software and/or logic to provide video content based on a user interaction. The techniques described herein provide a new data-centric architecture for video analytics that allows the sub sumption of sub-tasks under larger or more comprehensive analytics tasks. Video processing application 103 and the broker 109 of the computing device 101 or the smart capture device 123 and other components of the system 100 working together can decompose a video stream to fragments and distribute the fragments to a distributed commit log for further processing, which provides data integration and real-time data processing. This is advantageous since data is available and can be easily accessed on different storage and processing systems and data streams can be derived from the analysis of other streams based on real-time data processing. Further, the monitoring application 213 enables the design of complex video analytics in terms of sub-tasks or sub-analytics.

In some embodiments, the monitoring application 213 includes a detector 215, a determining engine 217, and a selection module 219. The detector 215 may include software and/or logic to provide the functionality for receiving data from a sensor/device and filtering the data. The sensor may be a Bluetooth low energy (BLE) sensor that provides positioning data of a user, a camera that captures a video, a low-resolution depth camera that measures volume occupancy, etc. In some embodiments, the detector 215 is classified into different categories based on the types of data it receives. For example, the detector 215 can be an occupancy detector if it receives volume occupancy data from a low-resolution depth camera, a location detector if it receives positioning data, a saliency detector if it receives video fragments generated based on saliency of a video from a smart camera.

In some embodiments, the detector 215 receives data from a series of sensors including the sensor 113 and filters the data based on one or more criteria. For example, an occupancy detector may filter the received data based on whether an occupancy event is detected. A saliency detector may filter the video fragments based on whether a user is interested in it. There can be a number of filter criteria depending on the data type, the event associated to the type of data, and other factors. However, no matter what a filter criterion is, the output data (e.g., the filtered data) of the detector 215 is less than the input data (e.g., the received data) of the detector 215. This is significant to the subsumption structure described herein because less data is propagated when going up in the hierarchy of the structure and thus a complex video analytics task can be built incrementally from simple sub-tasks.

When filtering the data, in some embodiments, the detector 215 also attaches information to the filtered data. For example, the detector 215 may tag filtered data with an identifier of a sensor for the purpose of distinguishing where the data came from.

The determining engine 217 may include software and/or logic to provide the functionality for integrating the filtered data received from the detector 215. In some embodiments, the determining engine 217 identifies one or more control sequences from the input filtered data, and determines whether to generate a first output sequence based on the one or more control sequences. In some embodiments, the determining engine 217 filters or gates a portion of the received data based on the one or more control sequences, and determines whether to generate the first output sequence based on the filtering result and a sequence criterion. For example, the filtering result indicates that an event has occurred such as a person has showed up or left, a conference has started or ended, etc. In one embodiment, the sequence criterion includes a threshold time duration. If the determining engine 217 determines that a person has been present for more than a threshold time duration, the determining engine 217 generates the first output sequence. In some embodiments, once the first output sequence is generated, the determining engine 217 also generates an alert signal for triggering the provision of the video content. As a higher layer than the detector 215 in the hierarchy of the subsumption structure, again, the determining engine 217 outputs less data than the input data by integrating the input data.

The selection module 219 may include software and/or logic to provide the functionality for selecting video fragments for providing to a user. In some embodiments, the selection module 219 selects video fragments from the filtered data received from the detector 215 based on the first output sequence received from the determining engine 217 and generates a second output sequence of video fragments for providing to the user. The generation of the second output sequence as well as the first output sequence is mainly based on a gating operation as described below with reference to FIG. 6B. In other embodiments, the selection module 219 selects video fragments only if an alert signal from the determining engine 217 was received.

Figure 6A:
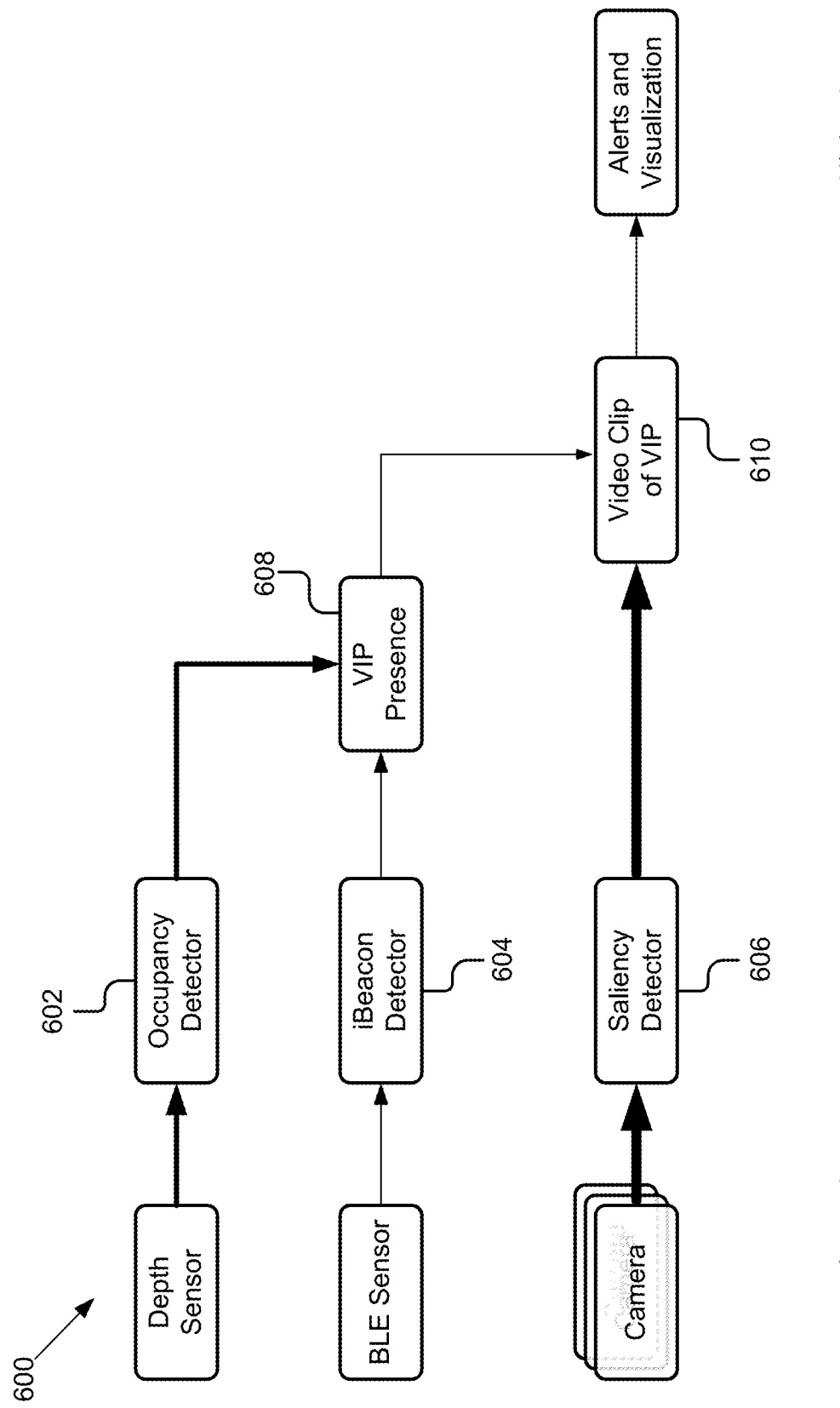
FIG. 6A depicts a block diagram illustrating one embodiment of subsumption structure of providing video content of user interaction upon detecting presence of a user.

FIG. 6A depicts a block diagram 600 illustrating one embodiment of subsumption structure of providing video content of user interaction upon detecting presence of a user. Consider a problem of a retailer, who wants a system that alerts the staff whenever a VIP shopper lingers or dwells in front of a display for a promotional product. A shopper is deemed to be a VIP if she or he has opted-in to a retailer rewards program, which can be determined by a phone application downloaded and installed on the shopper's smartphone. Along with the alert, the retailer also wants a short video clip showing the interaction of the shopper with the product to be generated and provided to the staff.

In the example of FIG. 6A, the alert system includes three hardware sensors: a low-resolution depth camera that acts as a depth sensor to measure volume occupancy, a BLE device that acts as beacon and sensor to obtain positioning data of a shopper, and a set of high-resolution video cameras. These sensors transmit the collected data to corresponding detectors, e.g., the occupancy detector 602, the iBeacon detector 604, and the saliency detector 606.

The occupancy detector 602 receives a sequence of readings from the depth sensor in the form of depth video segments, and filters this sequence based on whether an occupancy event is detected. The output of the occupancy detector 602 is a subset of its input sequence, and thus the output data rate is smaller than the input.

The iBeacon detector 604 receives a sequence of readings from the BLE sensor and filters this sequence based on whether the shopper is a VIP that has opted-in to the retailer rewards program, e.g., whether a registered smartphone application is recognized. Similarly, the output of the iBeacon detector 604 is also a subset of its input sequence. The iBeacon detector 604 also tags the elements of the output sequence with the identifier of the BLE sensor to distinguish the data from that received from other detected devices.

Further, the camera output is fed to the saliency detector 606 to produce a sequence of fragments. For example, the camera may be a smart capture device that is capable of decomposing the video into fragments. The saliency detector 606 then filters the fragments based on whether the fragments correspond to the area in front of the display, e.g., the promotional product.

In some embodiments, the operation of the VIP presence block 608 is performed by the determining engine 217. The determining engine 217 takes both the output of the occupancy detector 602 and the output of iBeacon detector 604 as input. The determining engine 217 uses the second input sequence from the occupancy detector 602 as a control sequence to filter or gate the first input sequence from the iBeacon detector 604. In this case, the determining engine 217 filters the first input sequence based on whether there is a corresponding element in a second input sequence with a comparable timestamp. Based on the filtering result and a criterion, the determining engine 217 generates an output sequence, which is a sequence of BLE events that correspond to (1) valid or relevant occupancy and (2) detecting a registered smartphone. The valid or relevant occupancy may mean, for example, that the volume in front of the display of the promotion product has been occupied by the shopper for at least 30 seconds or more. The detection of a registered smartphone, in one embodiment, means that the application on the shopper's smartphone is awaken by the BLE beacon and the application in turns signals to the BLE sensor of its presence. The output sequence of the determining engine 217 therefore indicates presence of a VIP shopper in front of a display of a promotional product.

The video clip of VIP 610 is then selected by the selection module 219 by gating the video fragments from the saliency detector 606 using the output sequence of the determining engine 217 (e.g., the output of the VIP presence block 608) as a control sequence. The output sequence of the determining engine 217 indicates presence of a VIP shopper. The selection module 219 identifies the fragments based on whether there is a corresponding element in the output sequence of the determining engine 217 with comparable timestamp, and generates a sequence of video segments for presenting to the staff, such that the staff obtains a high-resolution, short video clip of the interaction of the VIP Shopper in front of a display of a promotional product.

FIG. 6A shows a general subsumption architecture, where (1) sub-analytics are organized into a hierarchy of layers, (2) each layer implements a particular level of analytics competence, and (3) higher levels subsume lower levels in order create more complex analytics. For example, the example of FIG. 6A includes a layer of detectors (e.g., detector 602, 604, and 606) and a layer of the VIP presence block 608 that is higher than the detector layer in the hierarchy. The detector layer receives data from sensors and performs a first layer filtering, while the VIP presence layer performs a second layer filtering and generates a sequence indicating the presence of a VIP shopper. It should be noted that less data is propagated when going up in the hierarchy as indicated by the dash-lined arrow 612, and that a complex video analytics task is built incrementally from simpler sub-tasks. In other words, higher levels subsume lower levels in order create more complex analytics.

Combining the subsumption architecture in FIG. 6A and the distributed commit log described above, a distributed alerting system with wider choice of hardware realizations is obtained. It is therefore advantageous in scaling with increasing number of system components or rising task complexity as compared to the monolithic structure in traditional video analytics systems. Another benefit of this system is that sub-tasks can be re-usable. For example, the output of the depth sensor can also be provided to a people counter module (not shown) for a different task, such as crowd control.

Figure 6B:
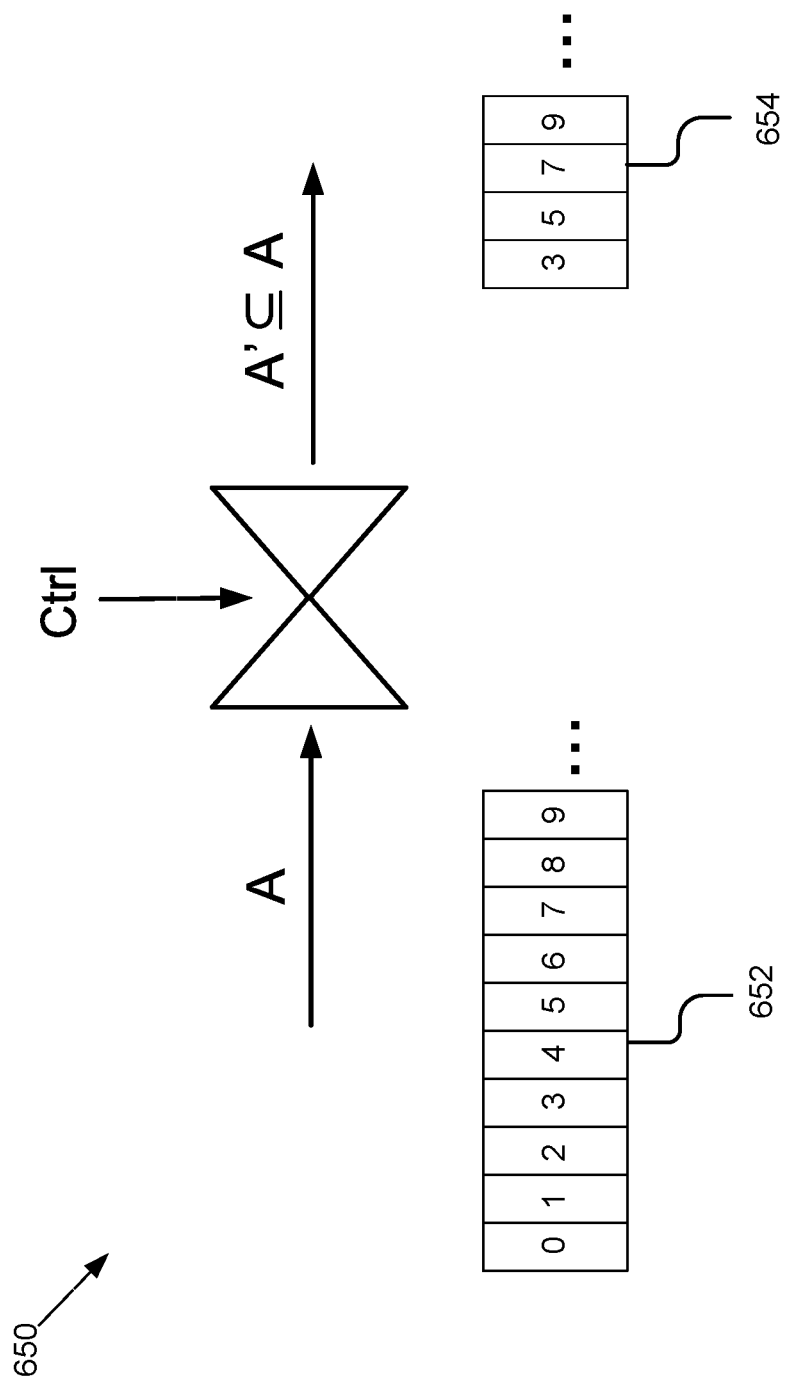
FIG. 6B depicts a block diagram illustrating a gating operation.

In the content provision process shown in FIG. 6A, filtering or gating operations are repeatedly performed by the determining engine 217 and the selection module 219 to obtain an output sequence. FIG. 6B depicts a block diagram 650 illustrating a gating operation. Given an input sequence A (e.g., video segments 652), and a control sequence Ctrl (e.g., Wi-Fi, BLE, depth sensor, other cameras, etc.,), a gating operation allows a subset of A to be selected as the output A' and tagged (e.g., video segments 654).

Figure 7:
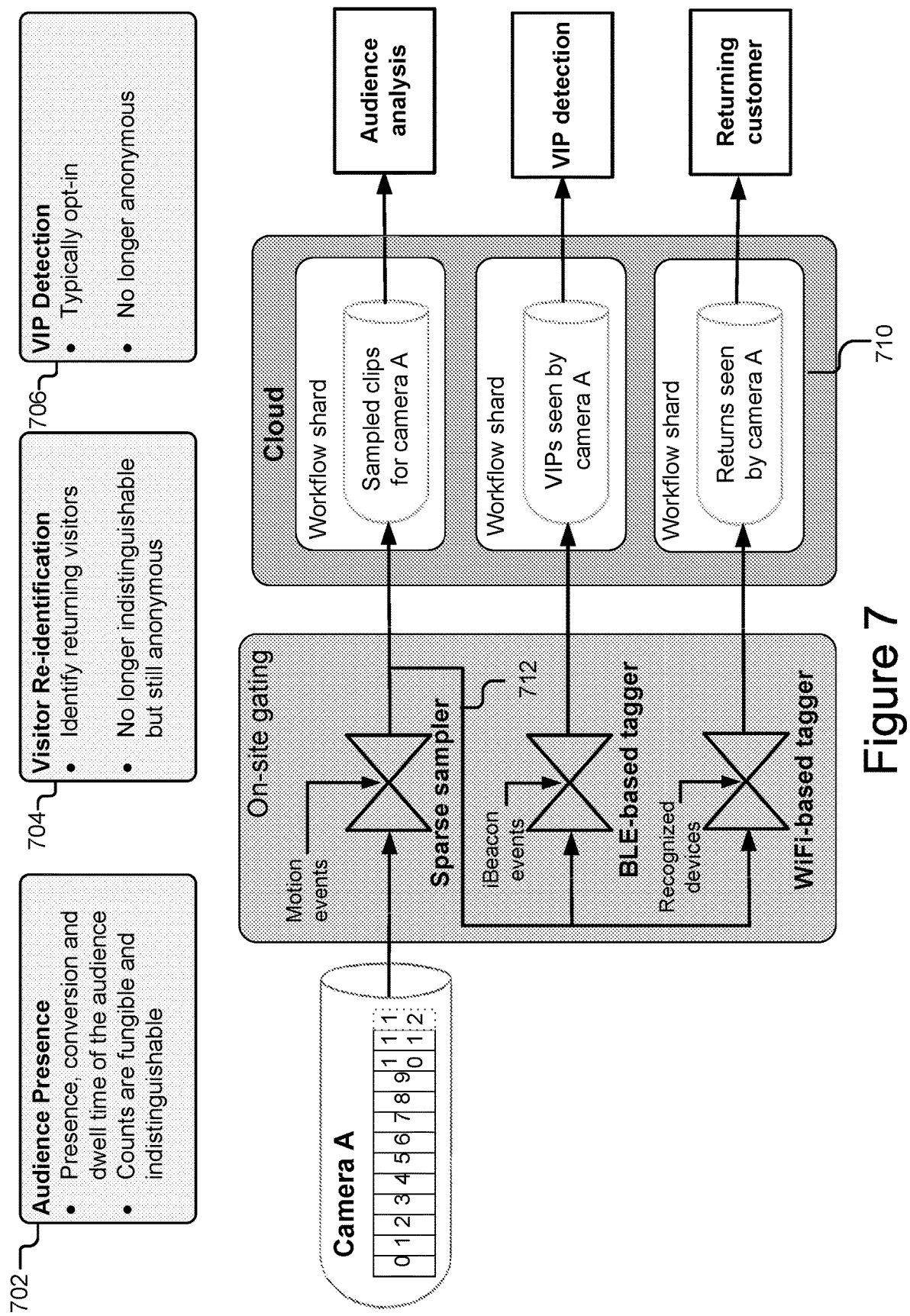
FIG. 7 depicts a block diagram illustrating one embodiment of subsumption structure of providing video content for different purposes.

FIG. 7 depicts a block diagram 700 illustrating one embodiment of a subsumption structure for providing video content for different purposes. Consider a retail workflow for distinguishing returning visitors from a general audience and distinguishing loyal shoppers (e.g., VIP shoppers) from the returning visitors. The audience presence 702 can be enabled by detecting faces on relevant video segments, where relevancy may be determined based on the detected degree of motion. The visitor re-identification can be assisted with Wi-Fi sensors, where the Wi-Fi sensors recognize mobile devices that have visited a store recently. The VIP detection is done using BLE iBeacons. In the example of FIG. 7, it is not important to detect whether the VIP is in front of a promotional product, thus no depth sensor for volume occupancy is necessary.

An example subsumption strategy for providing video content for different purposes as indicated in 702-704. Similar to FIG. 6A, the monitoring application 213 receives video sequences from camera A, and performs gating and tagging operations based on control sequences to output a subset of input video sequences that satisfies certain criteria. The output video sequences are taken as input by a processing server on the cloud including a video processing application 103 to group into different topics, split into segments, publish into topics, and distribute to a broker or a cluster of brokers to store on a distributed commit log as indicated in 710. The video segments stored in partitioned logs associated with topics are then requested by the staff and retrieved for the staff for the purposes of audience analysis, VIP detection, or analysis of returning customers. It should be noted that the output sequence 712 of the sparse sampler is reused as a control sequence for both the BLE-based tagger and the Wi-Fi-based tagger, and therefore saves computation resources.

Returning to FIG. 2B, the user interface engine 221 may include software and/or logic for providing user interfaces to a user, for example via display device 239. The user interface engine 221 of the broker 109 is optional. In some embodiments, the user interface engine 221 receives instructions from the selection module 219, and sends graphical user interface data to the client device 115 via the communication unit 241 causing selected video segments to be displayed to a user.

Figure 8:
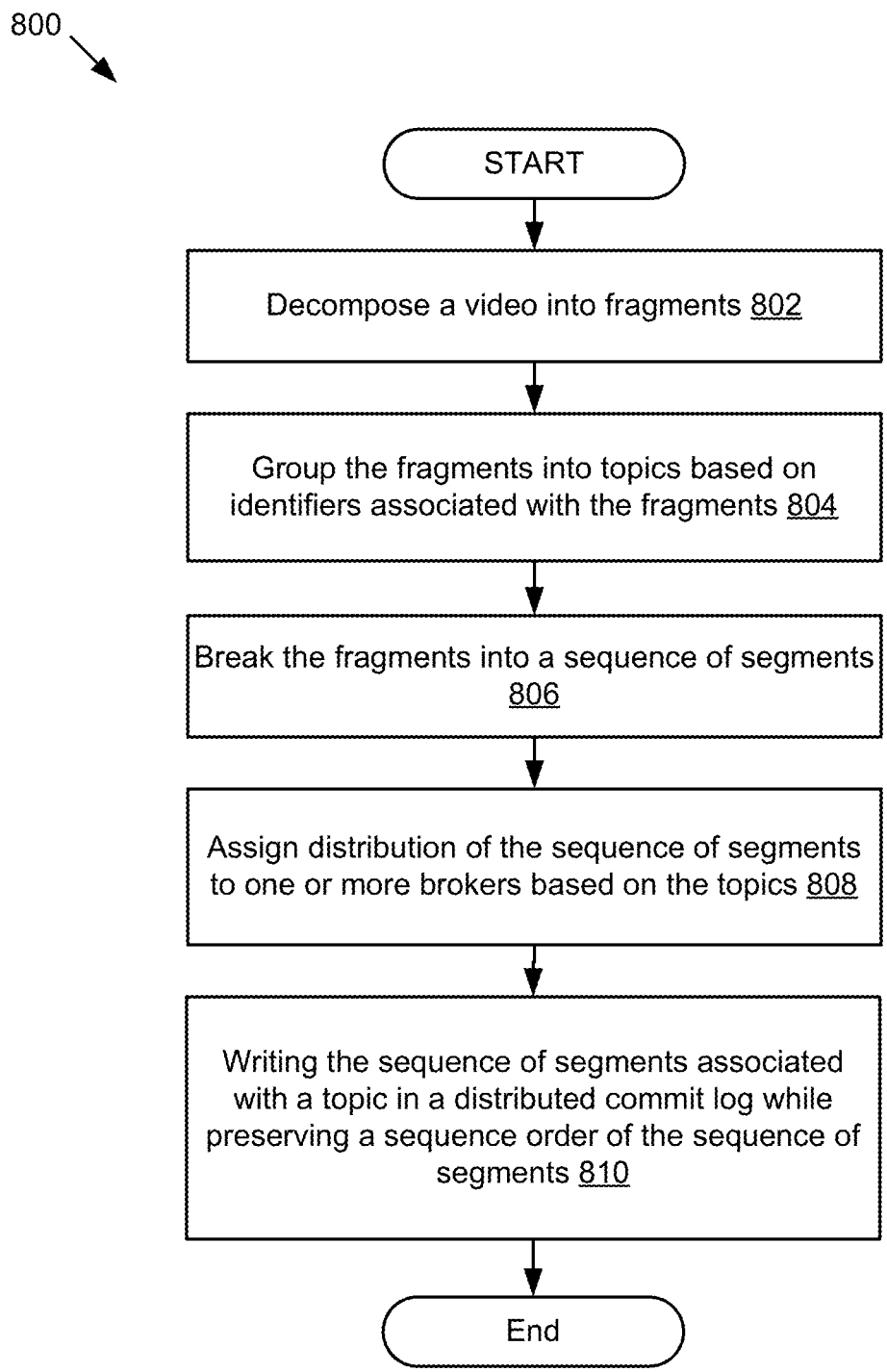
FIG. 8 depicts a flow diagram illustrating one embodiment of a method for distributing video segments of a video to one or more brokers based on topics and storing the video segments in a distributed commit log associated with the topics.

FIG. 8 depicts a flow diagram illustrating one embodiment of a method 800 for distributing video segments of a video to one or more consumers based on topics and a distributed commit log associated with the topics. As described above, the video processing application 103 of the computing device 101 or smart capture device 123 may include a fragment module 201, a group module 203, a distribution module 205, and a segmenter 207. At 802, the fragment module 201 decomposes a video into fragments. At 804, the group module 203 groups the fragments into topics based on identifiers associated with the fragments. At 806, the segmenter 207 breaks the fragments into a sequence of segments. At 808, the distribution module 205 assigns the distribution of the sequence of segments to one or more brokers based on the topics.

In some embodiments, the broker 109 of the computing device 101 or a smart capture device 123 includes a log controller 211. At 810, the log controller 211 of the one or more brokers writes the sequence of segments associated with a topic in a distributed commit log while preserving a sequence order of the sequence of segments.

Figure 9:
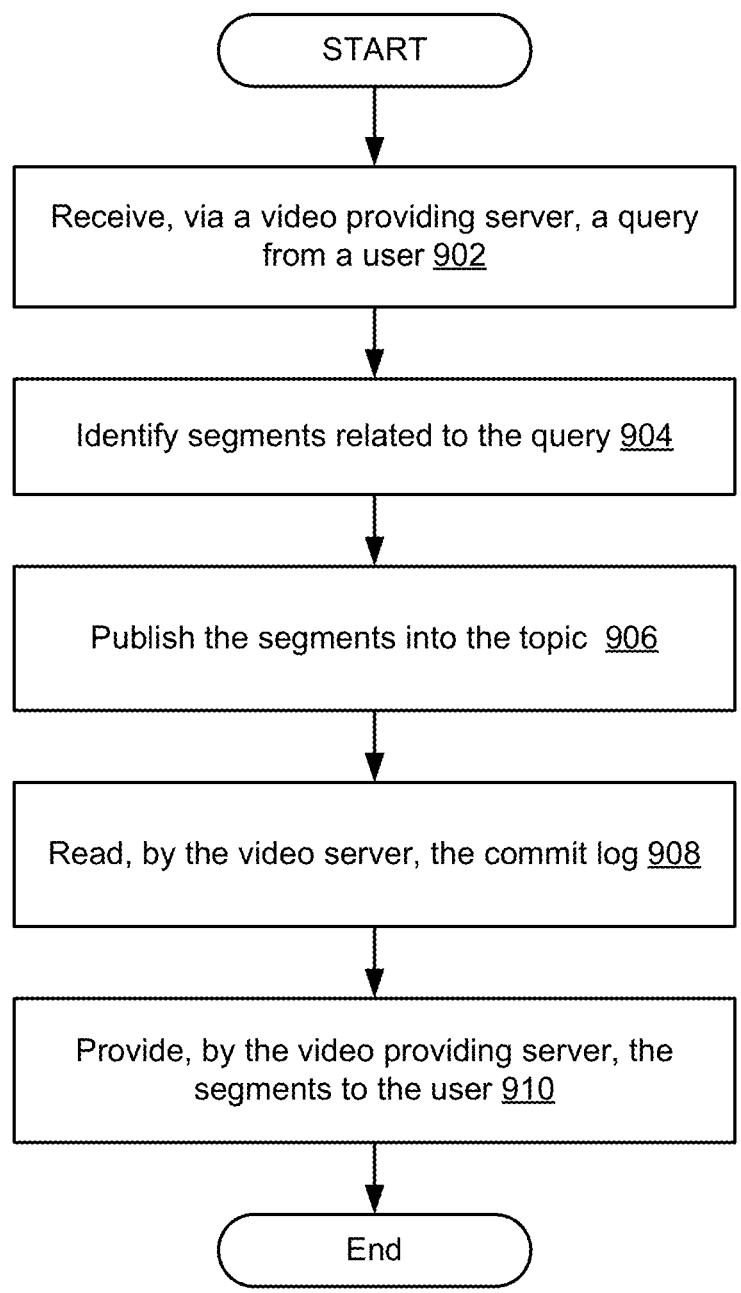
FIG. 9 depicts a flow diagram illustrating embodiments of a method for providing video content to a user responsive to a query from the user.

FIG. 9 depicts a flow diagram illustrating embodiments of a method 900 for providing video content to a user responsive to a query from the user. The method 900 is implemented by a computing device 101 or a smart capture device 123 in communication with a video server 121. The computing device 101 or a smart capture device 123 includes a video processing application 103 and a broker 109.

At 902, the video processing application 103 receives a query from a user via the video server 121. At 904, the video processing application 103 identifies segments related to the query. At 906, the broker 109 communicates with the video processing application 103 to publish the segments into a topic and store the segments in corresponding partitions of a commit log. At 908, the video server 121 (already subscribed to the topic) reads the commit log. At 910, the video server 121 provides the segments to the user.

Figure 10:
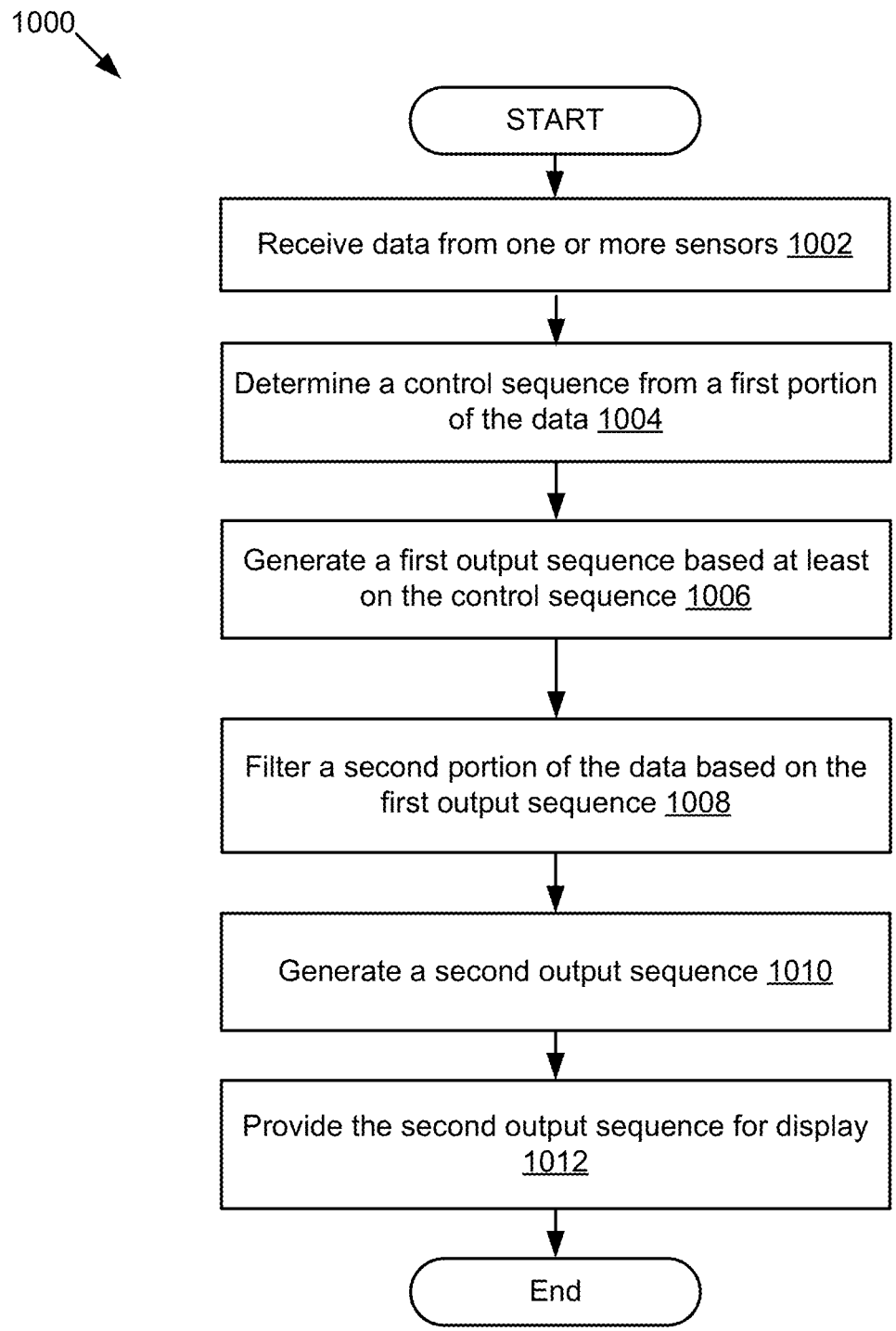
FIG. 10 depicts a flow diagram illustrating embodiments of a method for providing video content in a subsumption architecture.

FIG. 10 depicts a flow diagram illustrating embodiments of a method 1000 for providing video content in a subsumption architecture. The method is implemented by a broker 109 of a computing device 101 or a smart capture device 123. In particular, the broker 109 includes a monitoring application 213 and a user interface engine 221. The monitoring application 213 includes a detector 215, a determining engine 217, and a selection module 219.

At 1002, the detector 215 receives data from one or more sensors. At 1004, the determining engine 217 determines a control sequence from a first portion of the data. For example, in FIG. 6A, the determining engine 217 uses the output of an occupancy detector as a control sequence. At 1006, the determining engine 217 generates a first output sequence based, at least, on the control sequence. At 1008, the selection module 219 filters a second portion of the data based on the first output sequence. For example, in FIG. 6A, the selection module 219 receives the first output sequence indicating presence of a VIP shopper from the determining engine 217, and filters a sequence of fragments based on using the first output sequence as the control sequence. At 1010, the selection module 219 generates a second output sequence. At 1012, the selection module 219 communicates with the user interface engine 221 to provide the second output sequence for display.

A system and method for distributing video segments of a video to one or more consumers based on topics and a distributed commit log associated with the topics has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   decomposing a video into fragments;
   breaking the fragments into a sequence of segments, each fragment being associated with a topic;
   writing the sequence of segments in a plurality of commit logs that are part of a distributed commit log by appending the sequence of segments to an end of each partition of each commit log of the plurality of commit logs based on the topic to preserve a sequence order of the sequence of segments;
   receiving first sensor data including positioning data;
   receiving second sensor data including volume occupancy data;
   filtering the first sensor data by using the second sensor data as a first control sequence to generate an output sequence;
   reading the distributed commit log for the sequence of segments; and
   using the output sequence as a second control sequence to filter the sequence of segments to identify a subset of the sequence of segments for provision.

2. The computer-implemented method of claim 1, further comprising:
   dividing the topic into a plurality of partitions; and
   assigning the plurality of partitions of the topic to a plurality of commit logs.

3. The computer-implemented method of claim 1, wherein the sensor is one of a Wi-Fi sensor, a Bluetooth sensor, a depth sensor, or a capture device.

4. The computer-implemented method of claim 1, further comprising grouping the fragments into topics based on identifiers associated with the fragments, wherein writing the sequence of segments in the plurality of commit logs that are part of the distributed commit log is based on the topics.

5. The computer-implemented method of claim 4, wherein grouping the fragments into the topics comprises grouping the fragments of the video from a capture device into a topic associated with the capture device.

6. The computer-implemented method of claim 4, wherein grouping the fragments into the topics comprises assigning a single fragment representing the video to a singleton topic.

7. The computer-implemented method of claim 4, wherein decomposing the video into fragments further comprises identifying a salient portion from the video and determining a subset of frames of the video including the salient portion as a fragment.

8. The computer-implemented method of claim 1, further comprising:
   receiving a query from a user;
   responsive to the query, identifying and writing the segments into the distributed commit log.

9. A system comprising:
   one or more processors; and
   a memory, the memory storing instructions, which when executed cause the one or more processors to:
   decompose a video into fragments;
   break the fragments into a sequence of segments, each fragment being associated with a topic;
   write the sequence of segments in a plurality of commit logs that are part of a distributed commit log by appending the sequence of segments to an end of each partition of each commit log of the plurality of commit logs based on the topic to preserve a sequence order of the sequence of segments;

receive first sensor data including positioning data;

receive second sensor data including and volume occupancy data;

filter the first sensor data by using the second sensor data as a first control sequence to generate an output sequence;

read the distributed commit log for the sequence of segments; and use the output sequence as a second control sequence to filter the sequence of segments to identify a subset of the sequence of segments for provision.

10. The system of claim 9, wherein the instructions further cause the one or more processors to:

divide the topic into a plurality of partitions; and assign the plurality of partitions of the topic to a plurality of commit logs.

11. The system of claim 9, wherein the sensor is one of a Wi-Fi sensor, a Bluetooth sensor, a depth sensor, or a capture device.

12. The system of claim 9, wherein the instructions further cause the one or more processors to:

group the fragments into topics based on identifiers associated with the fragments; and write the sequence of segments in the plurality of commit logs that are part of the distributed commit log based on the topics.

13. The system of claim 12, wherein to group the fragments into the topics, the instructions cause the one or more processors to group the fragments of the video from a capture device into a topic associated with the capture device.

14. The system of claim 12, wherein, to decompose the video into fragments, the instructions cause the one or more processors to:

identify a salient portion from the video; and determine a subset of frames of the video including the salient portion as a fragment.

15. The system of claim 9, wherein the instructions cause the one or more processors to:

receive a query from a user;

responsive to the query, identify and write the segments into the distributed commit log.

16. A computer program product comprising a non-transitory computer readable medium storing a computer readable program, wherein the computer readable program when executed causes a computer to:

decompose a video into fragments;

break the fragments into a sequence of segments, each fragment being associated with a topic;

write the sequence of segments in a plurality of commit logs that are part of a distributed commit log by appending the sequence of segments to an end of each partition of each commit log of the plurality of commit logs based on the topic to preserve a sequence order of the sequence of segments;

receive first sensor data including positioning data;

receive second sensor data including volume occupancy data;

filter the first sensor data by using the second sensor data as a first control sequence to generate an output sequence;

read the distributed commit log for the sequence of segments; and use the output sequence as a second control sequence to filter the sequence of segments to identify a subset of the sequence of segments for provision.

17. The computer program product of claim 16, wherein the computer readable program causes the computer to:

divide the topic into a plurality of partitions; and assign the plurality of partitions of the topic to a plurality of commit logs.

18. The computer program product of claim 16, wherein the sensor is one of a Wi-Fi sensor, a Bluetooth sensor, a depth sensor, or a capture device.

19. The computer program product of claim 16, wherein the computer readable program causes the computer to:

group the fragments into topics based on identifiers associated with the fragments; and write the sequence of segments in the distributed commit log based on the topics.

20. The computer program product of claim 19, wherein to group the fragments into the topics, the computer readable program causes the computer to group the fragments of the video from a capture device into a topic associated with the capture device.

* * * * *

UNITED STATES PATENT AND TRADEMARK OFFICE
CERTIFICATE OF CORRECTION

PATENT NO. : 10,708,635 B2
APPLICATION NO. : 15/453722
DATED : July 7, 2020
INVENTOR(S) : Hector H. Gonzalez-Banos et al.

Page 1 of 1

It is certified that error appears in the above-identified patent and that said Letters Patent is hereby corrected as shown below:

In the Claims

In Column 25, Line 4, please replace "sensor data including and volume occupancy data" with --sensor data including volume occupancy data--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*